US012574661B2

(12) United States Patent　　　　(10) Patent No.:　US 12,574,661 B2

Chida et al.　　　　　　　　　　　　(45) Date of Patent:　Mar. 10, 2026

(54) PHOTOELECTRIC CONVERSION DEVICE, LIGHT DETECTION SYSTEM, MOVABLE BODY, AND METHOD OF CONTROLLING PHOTOELECTRIC CONVERSION DEVICE

(71) Applicant: CANON KABUSHIKI KAISHA, Tokyo (JP)

(72) Inventors: Kazuma Chida, Kanagawa (JP); Satoshi Omodani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 18/642,863

(22) Filed: Apr. 23, 2024

(65) Prior Publication Data

US 2024/0373147 A1　　Nov. 7, 2024

(30) Foreign Application Priority Data

May 1, 2023　(JP) ................................. 2023-075577

(51) Int. Cl.
　H04N 25/766　　　(2023.01)
　H04N 25/773　　　(2023.01)
　H04N 25/78　　　(2023.01)

(52) U.S. Cl.
　CPC ......... H04N 25/766 (2023.01); H04N 25/773 (2023.01); *H04N 25/78* (2023.01)

(58) Field of Classification Search
　CPC ... H10F 30/225; H10F 77/959; H04N 25/766; H04N 25/773; H04N 25/78; H04N 25/50
　See application file for complete search history.

(56) References Cited

U.S. PATENT DOCUMENTS

| | | | | |
|---|---|---|---|---|
| 11,665,431 B2 * | 5/2023 | Maekawa | ............ | H04N 25/773 |
| 11,792,529 B2 | 10/2023 | Yamanaka | | |
| 2019/0182442 A1 * | 6/2019 | Ikedo | .................... | H04N 25/773 |
| 2023/0370741 A1 * | 11/2023 | Tojima | ................. | H04N 25/773 |
| 2024/0365023 A1 * | 10/2024 | Kayama | ............... | H04N 25/773 |
| 2024/0365024 A1 * | 10/2024 | Nagamasa | ........... | H04N 25/709 |

FOREIGN PATENT DOCUMENTS

JP　　　2022-96472 A　　6/2022

OTHER PUBLICATIONS

U.S. Appl. No. 18/626,926, filed Apr. 4, 2024 by Kazuya Kayama.

* cited by examiner

*Primary Examiner* — Marly S Camargo

(74) *Attorney, Agent, or Firm* — VENABLE LLP

(57) ABSTRACT

A photoelectric conversion device comprises: a detector generating change in voltage based on a photon; a switch between the detector and a power node to supply current for the detector from the power node to change voltage of the detector to bias voltage when being in an ON state, and cutting off the current to the detector when being in an OFF state; first and second circuits generating first and second detection signals based on first and second periodic signals and the change in voltage of the detector, the first and second periodic signals having a phase difference; a counter counting the first or second detection signal to output a count value; and a controller generating first and second signals for causing the first and second circuits to generate the first and second detection signals, the first and second periodic signals being generated based on the first or second signal.

19 Claims, 21 Drawing Sheets

FIG. 14A
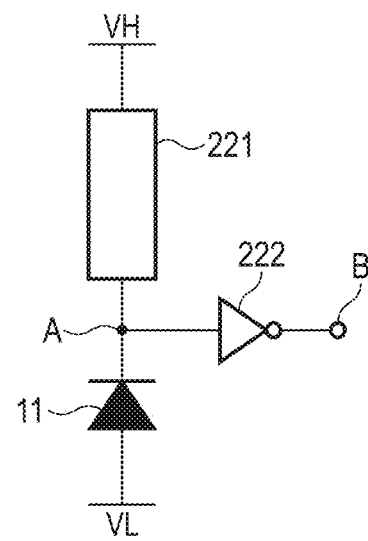
FIG. 14B
FIG. 14C
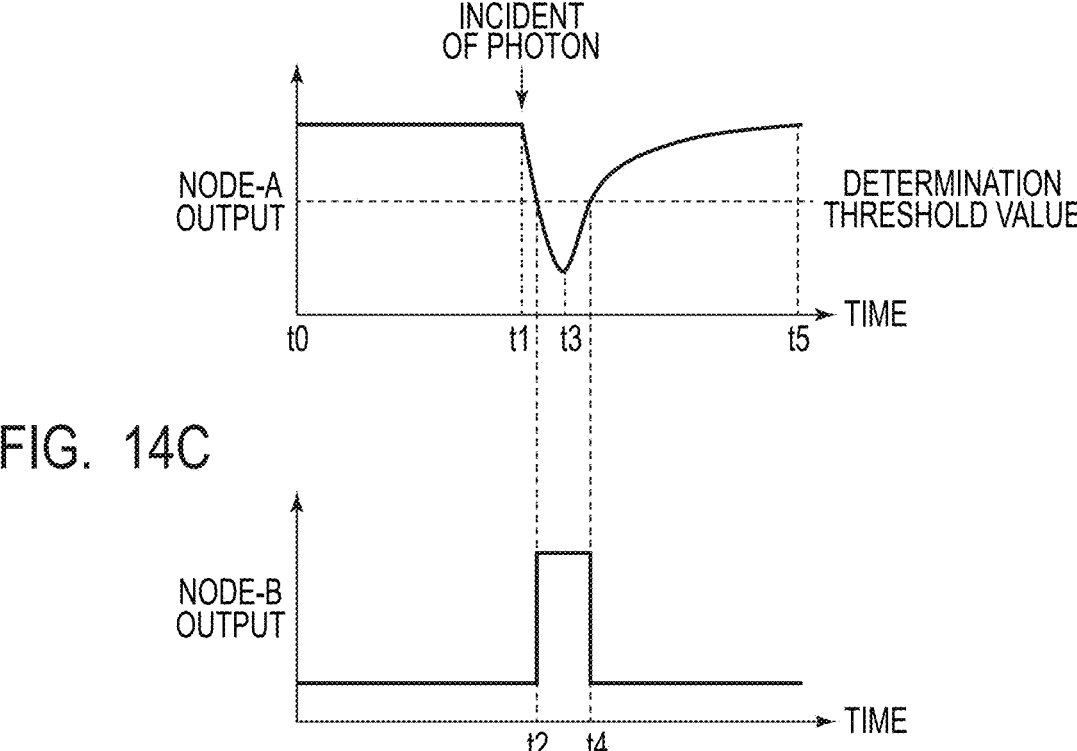

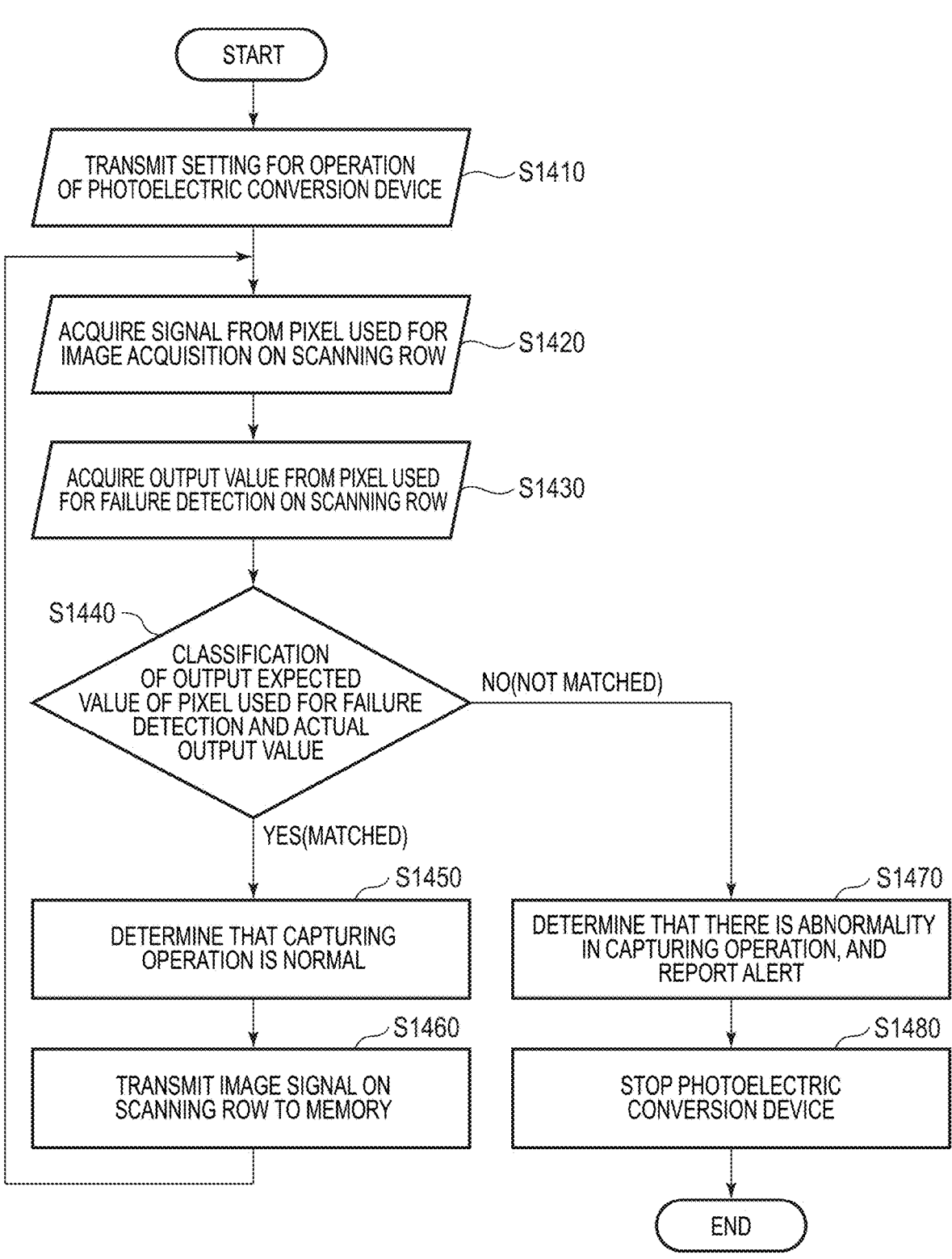

START

TRANSMIT SETTING FOR OPERATION OF PHOTOELECTRIC CONVERSION DEVICE — S1410

ACQUIRE SIGNAL FROM PIXEL USED FOR IMAGE ACQUISITION ON SCANNING ROW — S1420

ACQUIRE OUTPUT VALUE FROM PIXEL USED FOR FAILURE DETECTION ON SCANNING ROW — S1430

S1440 — CLASSIFICATION OF OUTPUT EXPECTED VALUE OF PIXEL USED FOR FAILURE DETECTION AND ACTUAL OUTPUT VALUE

NO(NOT MATCHED)

YES(MATCHED)

S1450 — DETERMINE THAT CAPTURING OPERATION IS NORMAL

S1470 — DETERMINE THAT THERE IS ABNORMALITY IN CAPTURING OPERATION, AND REPORT ALERT

S1460 — TRANSMIT IMAGE SIGNAL ON SCANNING ROW TO MEMORY

S1480 — STOP PHOTOELECTRIC CONVERSION DEVICE

END

PHOTOELECTRIC CONVERSION DEVICE, LIGHT DETECTION SYSTEM, MOVABLE BODY, AND METHOD OF CONTROLLING PHOTOELECTRIC CONVERSION DEVICE

BACKGROUND

Field

The present disclosure relates to a photoelectric conversion device, a light detection system, a movable body, and a method of controlling a photoelectric conversion device.

Description of the Related Art

Japanese Patent Application Laid-Open No. 2022-96472 discloses a method of inputting an output signal from a single photon avalanche diode (SPAD) to two counters and gating an output signal of SPAD inputted to each counter. According to Japanese Patent Application Laid-Open No. 2022-96472, the detection sensitivity of each counter to photons is adjusted by a period for which the gating signal is at a high level (i.e., a pulse width of the gating signal).

SUMMARY

However, according to the method described in Japanese Patent Application Laid-Open No. 2022-96472, gating signals having different pulse widths are required for each counter, which would cause the circuit configuration of the photoelectric conversion device to be complicated.

It is an object of the present disclosure to simplify a circuit configuration of a photoelectric conversion device.

According to one aspect of the present disclosure, a photoelectric conversion device includes: a detector that generates a change in voltage in response to an incident photon; a switch arranged between the detector and a power node, the switch supplying a current for the detector from the power node to change a voltage of the detector to a predetermined bias voltage when being in an ON state, the switch cutting off the current supplied from the power node to the detector when being in an OFF state; a first circuit that generates a first detection signal based on a first periodic signal and the change in voltage of the detector; a second circuit that generates a second detection signal based on a second periodic signal and the change in voltage of the detector, the second periodic signal having a predetermined phase difference with respect to the first periodic signal; a counter that counts the first detection signal or the second detection signal to output a count value; and a controller that generates: a first signal for causing the first circuit to generate the first detection signal; and a second signal for causing the second circuit to generate the second detection signal, wherein the first periodic signal and the second periodic signal are generated based on the first signal or the second signal.

Further features of the present disclosure will become apparent from the following description of exemplary embodiments with reference to the attached drawings.

BRIEF DESCRIPTION OF THE DRAWINGS

FIG. 2 illustrates a block diagram of the photoelectric conversion device according to the first embodiment.

FIG. 3 illustrates a circuit diagram of a pixel unit according to the first embodiment.

FIG. 5 illustrates a timing chart showing an operation of a counter according to the first embodiment.

FIG. 6 illustrates a circuit diagram of the pixel unit according to the second embodiment.

FIG. 8 illustrates a circuit diagram of the pixel unit according to the third embodiment.

FIG. 12 illustrates a diagram showing an arrangement example of the circuit board according to the fourth embodiment.

FIG. 13 illustrates a circuit diagram of the avalanche photo diode (APD) and the pulse generator according to the fourth embodiment.

FIG. 14A illustrates a diagram showing the relation between the operation of the APD and the output signal in the fourth embodiment.

FIG. 14B illustrates a diagram showing the relation between the operation of the APD and the output signal in the fourth embodiment.

FIG. 14C illustrates a diagram showing the relation between the operation of the APD and the output signal in the fourth embodiment.

FIG. 16 illustrates a schematic diagram of the endoscopic surgery system according to the sixth embodiment.

FIG. 18 illustrates a flowchart showing the operation of the light detection system according to the seventh embodiment.

DESCRIPTION OF THE EMBODIMENTS

Figure 1:
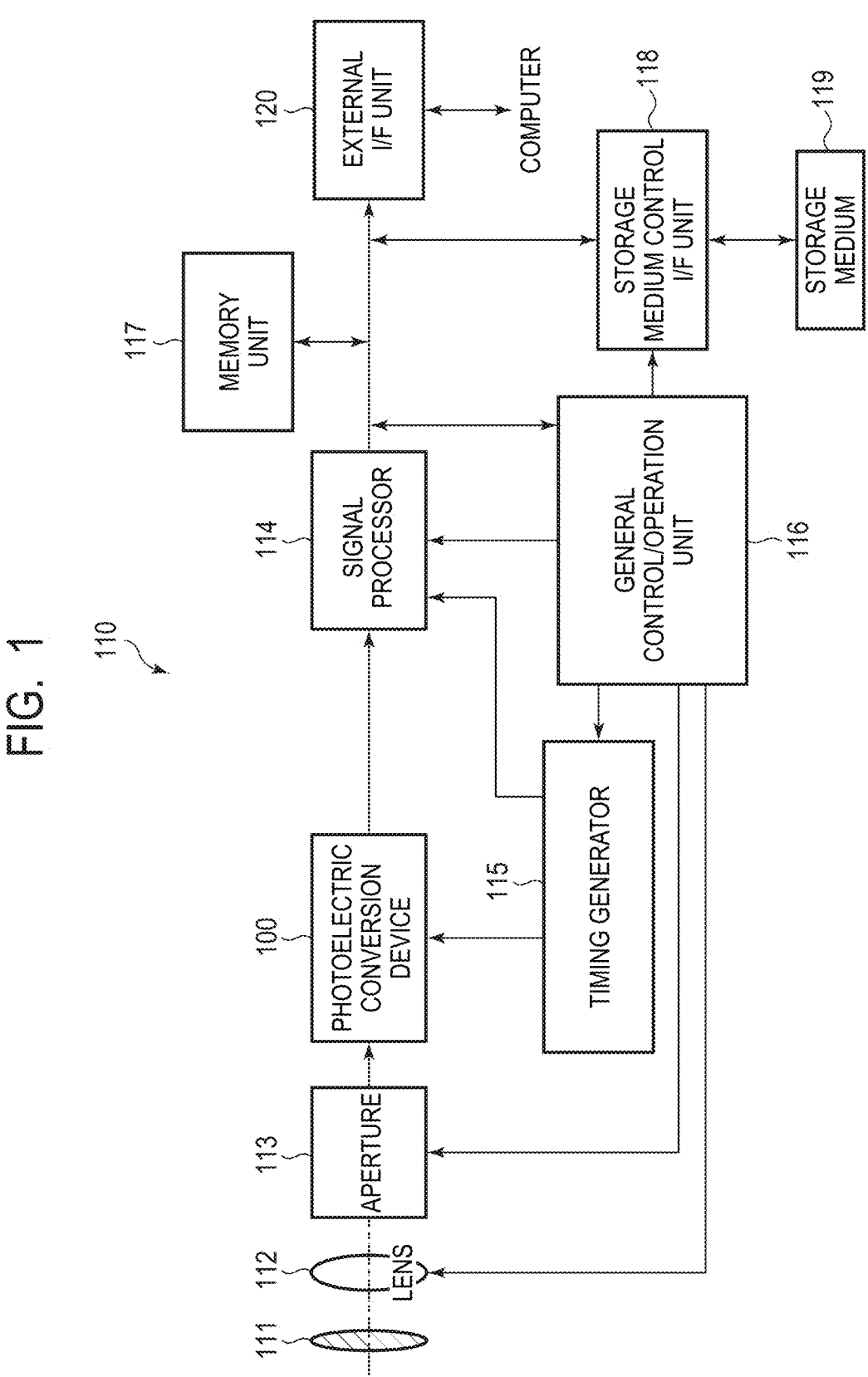
FIG. 1 illustrates a block diagram of an imaging system according to the first embodiment.

Preferred embodiments of the present disclosure will now be described in detail with reference to the accompanying drawings. In the drawings, elements having common functions are denoted by the same reference symbols, and overlapping descriptions may be omitted or simplified.

First Embodiment

FIG. 1 is a block diagram of an imaging system 110 according to the first embodiment. The imaging system 110 is an aspect of a light detection system. The imaging system 110 includes a barrier 111, a lens 112, an aperture 113, a photoelectric conversion device 100, a signal processor 114, a timing generator 115, a general control and operation unit 116, a memory unit 117, a storage medium control I/F unit 118, a storage medium 119, and an external I/F unit 120. The barrier 111 protects the lens, and the lens 112 forms an optical image of a subject on the photoelectric conversion device 100. The aperture 113 varies the amount of light passing through the lens 112. The photoelectric conversion device 100 converts an optical image formed by the lens 112 into image data. The signal processor 114 compresses data and executes various corrections for the imaging data output from the photoelectric conversion device 100. For example, the signal processor 114 performs pixel interpolation processing, color conversion processing, and the like based on pixel signals output from the photoelectric conversion device 100. The signal processor 114 generates digital image data in RGB format, YUV format, or the like based on the pixel signals.

The timing generator 115 outputs various timing signals to the photoelectric conversion device 100 and the signal processor 114. The general control and operation unit 116 may include an image signal processor (ISP), an application specific integrated circuit (ASIC), a programmable integrated circuit (FPGA), etc. The general control and operation unit 116 controls the entire imaging system 110. The memory unit 117 temporarily stores image data. The storage medium control I/F unit 118 is an interface for recording image data in the storage medium 119, and reading the image data from the storage medium 119. The storage medium 119 is a detachable recording medium such as a semiconductor memory for recording or reading captured image data. The external I/F unit 120 is an interface for communicating with an external computer or the like. The timing signals may be input from the outside of the imaging system 110, and the imaging system 110 may include at least the photoelectric conversion device 100 and the signal processor 114 that processes the image signal output from the photoelectric conversion device 100.

In the present embodiment, the photoelectric conversion device 100 and the signal processor 114 are provided on different semiconductor substrates, but the photoelectric conversion device 100 and the signal processor 114 may be formed on the same semiconductor substrate. The imaging system 110 is a light detection system, and examples of the imaging system 110 include a digital still camera, a digital camcorder, a camera head, a copying machine, a facsimile, a mobile phone, a vehicle-mounted camera, an observation satellite, and a monitoring camera.

Each pixel may include a first photoelectric conversion unit and a second photoelectric conversion unit. The signal processor 114 processes the pixel signal that is based on the charge generated in the first photoelectric conversion unit and the pixel signal that is based on the charge generated in the second photoelectric conversion unit. The signal processor 114 acquires distance information from the imaging system 110 to a subject or an object.

Figure 2:
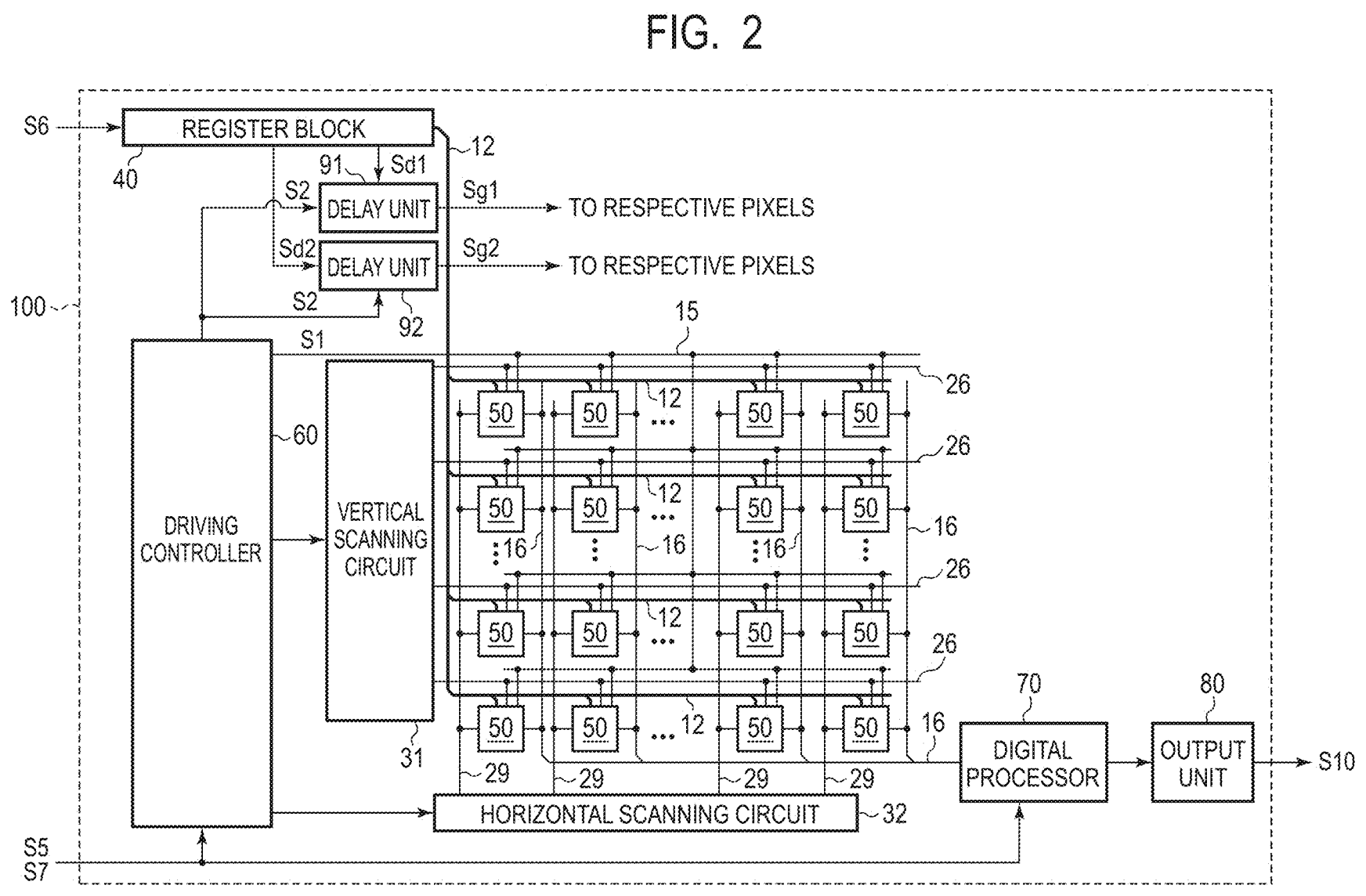

FIG. 2 is a block diagram of the photoelectric conversion device 100 according to the first embodiment. The photoelectric conversion device 100 includes multiple pixel units 50, a driving controller 60, a vertical scanning circuit 31, a horizontal scanning circuit 32, a register block 40, a digital processor 70, an output unit 80, and delay units 91, 92.

The pixel unit 50 outputs a pixel signal corresponding to the incident light through an output line 16. The multiple pixel units 50 are arranged in a matrix in a pixel region of the photoelectric conversion device 100. The number of the pixel units 50 is not particularly limited. For example, when used for an imaging camera, there may be 1920 pixel units 50 in the horizontal direction and there may be 1080 pixel units 50 in the vertical direction to form a matrix. When used in a line scan sensor, the pixel units 50 may be arranged in one row and multiple columns.

The detailed configuration of the pixel unit 50 will be described later.

The driving controller 60 receives a timing signal S5 from the general control and operation unit 116 via the timing generator 115. The driving controller 60 transmits a driving signal to the vertical scanning circuit 31 and the horizontal scanning circuit 32 based on the timing signal. The vertical scanning circuit 31 and the horizontal scanning circuit 32 are controlled by the driving signal. Further, the driving controller 60 transmits a periodic signal S1 to the pixel unit 50 via a periodic signal line 15 based on the timing signal. A single photon avalanche diode (SPAD) 510 of the pixel unit 50 is charged based on the periodic signal S1. The SPAD 510 will be described later. The driving controller 60 supplies a periodic signal S2 synchronized with the periodic signal S1 to the delay unit 91 and the delay unit 92. Further, the driving controller 60 also supplies other control signals (not shown) to control the overall operation of the photoelectric conversion device 100. The driving controller 60 may be driven using a clock from a phase locked loop (PLL) circuit or the like inside the photoelectric conversion device 100.

The vertical scanning circuit 31 receives the driving signal from the driving controller 60, and supplies a scanning signal to the pixel units 50 of each row via a scanning line 26. The vertical scanning circuit 31 sequentially scans the pixel units 50 in units of rows. That is, the vertical scanning circuit 31 selects a pixel row to output a pixel signal. The vertical scanning circuit 31 may be configured using a logic circuit such as a shift register or an address decoder.

The horizontal scanning circuit 32 receives the driving signal from the driving controller 60, and supplies a scanning signal to the pixel units 50 of each column via a signal line 29. The horizontal scanning circuit 32 sequentially scans the pixel units 50 in units of columns. That is, the horizontal scanning circuit 32 selects a pixel column to output a pixel signal. The horizontal scanning circuit 32 may be configured using a logic circuit such as a shift register or an address decoder. A pixel signal corresponding to the incident light is output through the output line 16 from the pixel unit 50 selected by the vertical scanning circuit 31 and the horizontal scanning circuit 32.

The register block 40 receives, from the general control and operation unit 116 via the timing generator 115, a setting signal S6 for setting the detection sensitivity to incident photons in the pixel units 50. The register block 40 supplies a selection signal S4 to the pixel units 50 via a setting signal line 12 based on the setting signal S6. The selection signal S4 is used for selecting the detection sensitivity to incident photons (i.e., a detection period). The register block 40 supplies a control signal Sd1 to the delay unit 91 and supplies a control signal Sd2 to the delay unit 92. The control signals Sd1, Sd2 will be described later. Further, the register block 40 may hold various setting parameters for the light detecting operation. For example, the register block 40 may store and transmit a timing setting of the light detecting operation, conditions for driving the pixels, setting of the driving capability of the analog driving portion in the photoelectric conversion device, and the like. As data communications for transmitting setting information, serial communication means such as I2C (Inter-Integrated Circuit), SPI (Serial Peripheral Interface), or other communication means may be used.

The delay unit 91 receives the periodic signal S2 (first signal) from the driving controller 60, and receives the control signal Sd1 from the register block 40. The control signal Sd1 includes a parameter for setting a delay time with respect to the input periodic signal S2. The delay unit 91 generates a periodic signal Sg1 (first periodic signal) obtained by delaying the periodic signal S2 by a predetermined time based on the control signal Sd1.

The delay unit 91 supplies the generated periodic signal Sg1 to the pixel unit 50. The periodic signal Sg1 will be described later.

The delay unit 92 receives the periodic signal S2 (second signal) from the driving controller 60, and receives the control signal Sd2 from the register block 40. The control signal Sd2 includes a parameter for setting a delay time with respect to the input periodic signal S2. The delay time set by the control signal Sd2 is different from the delay time set by the control signal Sd1. The delay unit 92 generates a periodic signal Sg2 (second periodic signal) obtained by delaying the periodic signal S2 by a predetermined time based on the control signal Sd2. The delay unit 92 supplies the generated periodic signal Sg2 to the pixel unit 50. The periodic signal Sg2 will be described later.

The digital processor 70 receives a timing signal S7 from the general control and operation unit 116 via the timing generator 115. The digital processor 70 receives pixel signals from the pixel units 50 via the output lines 16. The digital processor 70 performs various digital signal processing such as offset processing and digital gain processing on the pixel signals based on the timing signal S7.

The output unit 80 receives the pixel signals subjected to the signal processing from the digital processor 70. The output unit 80 transmits the pixel signal received from the digital processor 70 to the general control and operation unit 116 via the signal processor 114 as an output signal S10. The output unit 80 may include a serializer that converts parallel data into serial data, a low voltage differential signal (LVDS) transmitter, and the like. The output unit 80 may include parallel output means or the like instead of the serializer.

Figure 3:
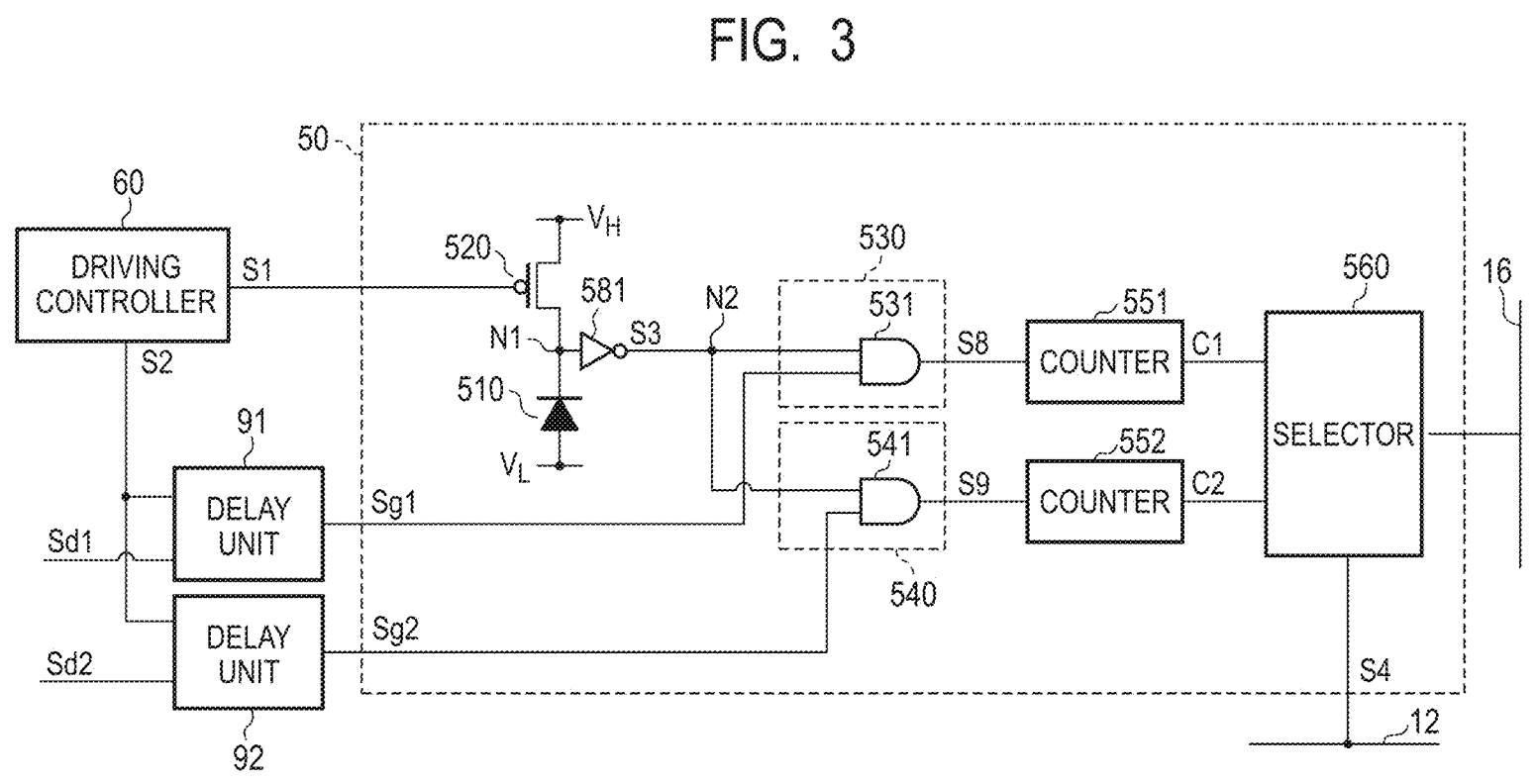

FIG. 3 is a circuit diagram of the pixel unit 50 according to the first embodiment. The pixel unit 50 includes the SPAD 510, a switch unit (switch) 520, a circuit 530 (first circuit), a circuit 540 (second circuit), a counter 551, a counter 552, and a selector 560.

The SPAD 510 is a photodiode working as a detector that detects the incidence of photons on the pixel unit 50. A cathode of the SPAD 510 is connected to an input node of a NOT gate 581 via a node N1. An anode of the SPAD 510 is connected to a node of a voltage source that supplies a voltage VL. The operation of the SPAD 510 will be described later. Although the SPAD 510 is described as a single photon avalanche diode in the present embodiment, an avalanche photodiode (APD) described later may be used.

The switch 520 connects and disconnects the SPAD 510 and the node (power supply node) of the voltage source for supplying the voltage VH. The switch 520 of the present embodiment is configured using a MOS transistor. A gate of the switch 520 is connected to the periodic signal line 15. A source of the switch 520 is connected to the node of the voltage source that supplies a voltage VH. A drain of the switch 520 is connected to the cathode of the SPAD 510 and the input node of the NOT gate 581 via the node N1. The periodic signal S1 is supplied from the driving controller 60 to the gate of the switch 520 via the periodic signal line 15. The periodic signal S1 may be a rectangular wave (pulse signal) having a predetermined amplitude and pulse width. While the periodic signal S1 is at a low level, the switch 520 is turned on, the voltage source and the SPAD 510 are electrically connected, and a current is supplied from the voltage source to the SPAD 510 through the switch 520. Therefore, the SPAD 510 is charged while the periodic signal S1 is at a low level, and the potential of the node N1 rises until a predetermined bias voltage is reached. While the periodic signal S1 is at the high level, the switch 520 is turned off, the voltage source and the SPAD 510 are electrically disconnected, and the supply of current from the voltage source to the SPAD 510 is cut off. Therefore, the SPAD 510 is not charged while the periodic signal S1 is at the high level, and the potential of the node N1 is maintained at the potential of when the switch 520 is switched from a turned-on state (ON state) to a turned-off state (OFF state). The voltage source for supplying the voltage VH and the voltage VL supplies a reverse bias voltage necessary for the SPAD 510 to perform the avalanche amplification operation via the switch 520. When a photon enters the SPAD 510, avalanche multiplication occurs in the SPAD 510, and the potential of the node N1 decreases. That is, the potential of the node N1 (the voltage of the SPAD 510) is changed by the current generated in response to the input of the photon to the SPAD 510. Depending on the potential of node N1, the NOT gate 581 transmits an inverted signal S3 to a node N2. When the potential of the node N1 becomes lower than a logical threshold due to the incidence of photons into the SPAD 510, the NOT gate 581 transmits the inverted signal S3 having a high-level. On the other hand, when the potential of the node N1 becomes equal to or higher than the logical threshold value by charging the SPAD 510, the NOT gate 581 transmits the inverted signal S3 having a low-level.

The circuit 530 outputs a detection signal S8 (first detection signal) indicating detection of a photon by the SPAD 510 based on the inverted signal S3 via the node N2 and the periodic signal Sg1 received from the delay unit 91. The circuit 530 includes an AND gate 531. One input node of the AND gate 531 is connected to the node N2, and the inverted signal S3 is input to the AND gate 531. The other input node of the AND gate 531 is connected to the delay unit 91, and the periodic signal Sg1 is input to the AND gate 531. The circuit 530 performs an AND operation on the signals input to the AND gate 531. The circuit 530 outputs a result of the operation based on the inverted signal S3 and the periodic signal Sg1 to the counter 551 as the detection signal S8.

The circuit 540 outputs a detection signal S9 (second detection signal) indicating detection of a photon by the SPAD 510 based on the inverted signal S3 via the node N2 and the periodic signal Sg2 received from the delay unit 92. The circuit 540 includes an AND gate 541. One input node of the AND gate 541 is connected to the node N2, and the inverted signal S3 is input to the AND gate 541. That is, the inverted signal S3 is commonly input to the circuit 530 and the circuit 540. The other input node of the AND gate 541 is connected to the delay unit 92, and the periodic signal Sg2 is input to the AND gate 541. The circuit 540 performs an AND operation on the signals input to the AND gate 541.

The circuit 540 outputs a result of the operation based on the inverted signal S3 and the periodic signal Sg2 to the counter 552 as the detection signal S9.

The counter 551 and the counter 552 count detection signals indicating the detection of the incidence of photons on the SPAD 510, and output a count result as a count value. Specifically, the counter 551 counts the number of times the detection signal S8 transmitted from the circuit 530 transitions from a low level to a high level as a count value C1 for a predetermined period (for example, one frame period). The counter 552 counts the number of times the detection signal S9 transmitted from the circuit 540 transitions from a low level to a high level as a count value C2 for a predetermined period (for example, one frame period).

After a predetermined period (for example, one frame period) has elapsed, the counter 551 and the counter 552 respectively output the count value C1 and the count value C2 as pixel values to the selector 560. The counter 551 and the counter 552 initialize the count value C1 and the count value C2 after outputting the count value C1 and the count value C2 to the selector 560.

The selector 560 receives multiple count values including count values C1 and C2 from the counter 551 and the counter 552. The selector 560 selects one count value from among multiple count values, and outputs the count value to the digital processor 70 via the output line 16. Specifically, the selector 560 receives the selection signal S4 from the register block 40. The selection signal S4 includes information specifying the count value selected by the selector 560. The selector 560 selects the count value C1 received from the counter 551 or the count value C2 received from the counter 552 based on the selection signal S4. When the pixel unit 50 is selected based on the scanning signal from the vertical scanning circuit 31 and the scanning signal from the horizontal scanning circuit 32, the selector 560 outputs the count value selected based on the selection signal S4 to the digital processor 70 as a pixel value.

The selection signal S4 may be a one-bit signal. For example, when the selection signal S4 is at a low level, the selector 560 outputs the count value C1 output by the counter 551. For example, when the selection signal S4 is at a high level, the selector 560 outputs the count value C2 output by the counter 552. The selection signal S4 may be a signal of two-bits or more. Specifically, the number of bits of the selection signal S4 can be determined according to the number of counters that count the count value. Further, the selector 560 may read only the count value designated by the selection signal S4, or may read all the count values input to the selector 560. That is, only the count values output from a part of the counters among multiple counters may be read by the selector 560, and the count values output from all the counters among the multiple counters may be read by the selector 560.

Figure 4:
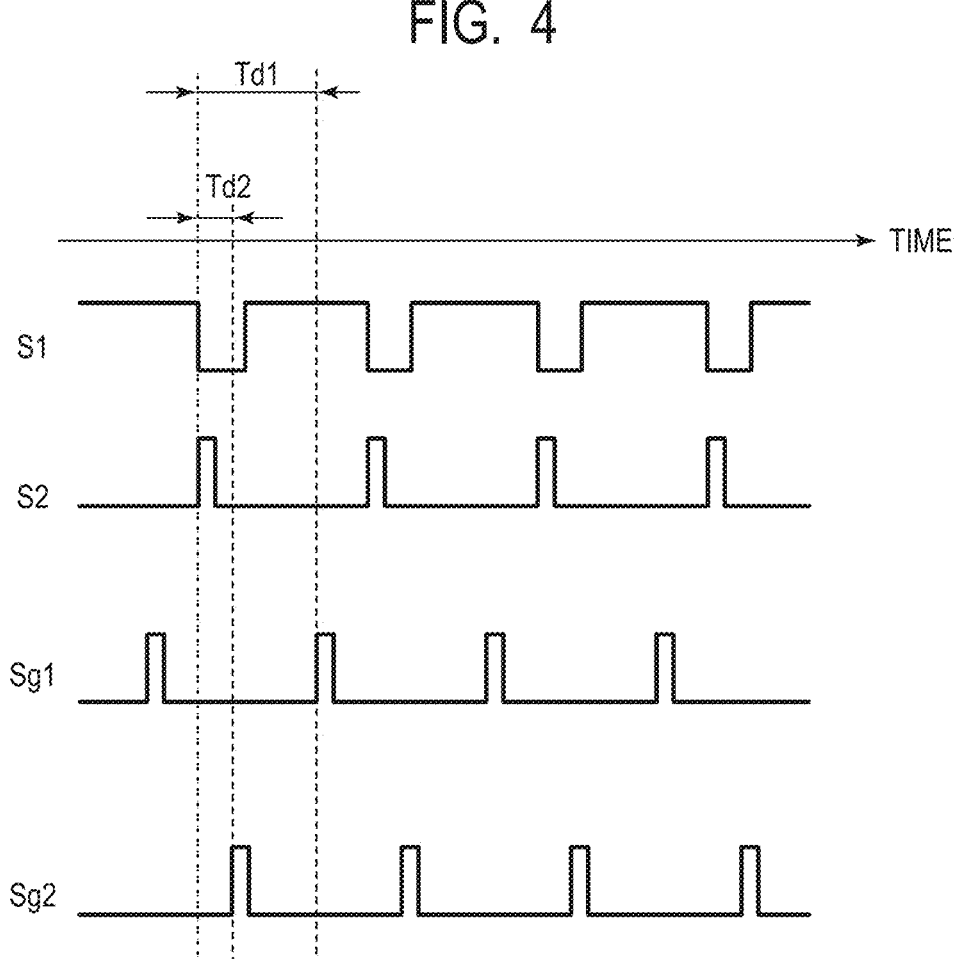
FIG. 4 illustrates a timing chart of signals input to the pixel unit according to the first embodiment.

FIG. 4 is a timing chart of signals input to the pixel unit 50 according to the first embodiment. FIG. 4 shows timing charts of the periodic signal S1 input to the pixel unit 50, the periodic signal S2 commonly input to the delay unit 91 and the delay unit 92, the periodic signal Sg1 output from the delay unit 91, and the periodic signal Sg2 output from the delay unit 92.

The periodic signal S1 determines the timing of charging the SPAD 510 of the pixel unit 50. In the present embodiment, the SPAD 510 is charged during a period in which the periodic signal S1 is at a low level, and the SPAD 510 is not charged during a period in which the periodic signal S1 is at a high level. The periodic signal S2 is synchronized with the periodic signal S1, and is a pulse signal that rises at a time when the periodic signal S1 falls.

In the present embodiment, the frequency of the periodic signal S2 is same as the frequency of the periodic signal S1.

The periodic signal Sg1 is a pulse signal, and has the same frequency as the periodic signal S2, and has the same pulse width as the periodic signal S2. On the other hand, the periodic signal Sg1 is delayed by a period Td1 with respect to the periodic signal S2. That is, there is a phase difference (first phase difference) corresponding to the period Td1 between the periodic signal Sg1 and the periodic signal S2. The period Td1 is determined based on the control signal Sd1 transmitted from the register block 40 to the delay unit 91.

The periodic signal Sg2 is a pulse signal, and has the same frequency as the periodic signal S2, and has the same pulse width as the periodic signal S2. On the other hand, the periodic signal Sg2 is delayed by a period Td2 with respect to the periodic signal S2. That is, there is a phase difference (second phase difference) corresponding to the period Td2 between the periodic signal Sg2 and the periodic signal S2. The period Td2 is shorter than the period Td1. Therefore, the phase difference between the periodic signal Sg2 and the periodic signal S2 is smaller than the phase difference between the periodic signal Sg1 and the periodic signal S2. That is, the periodic signal Sg2 has a phase difference obtained by subtracting the period Td1 from the period Td2 (i.e., a period of (Td2-Td1)) with respect to the periodic signal Sg1. The period Td2 is determined based on the control signal Sd2 transmitted from the register block 40 to the delay unit 92.

The length of the period for detecting photons by the SPAD 510 of the pixel unit 50 corresponds to the detection sensitivity to photons in the SPAD 510. The length of the period for detecting photons by the SPAD 510 varies depending on the periods Td1 and Td2. That is, the detection sensitivity to photons in the SPAD 510 depends on phase differences between the periodic signal S2 and the periodic signals Sg1, Sg2. The pixel unit 50 receives an input of two periodic signals Sg1 and Sg2 that are generated based on the common periodic signal S2 but have different phase differences with respect to the periodic signal S2. That is, the SPAD 510 of the pixel unit 50 can operate to have multiple detection sensitivities based on the common periodic signal S2.

Figure 5:
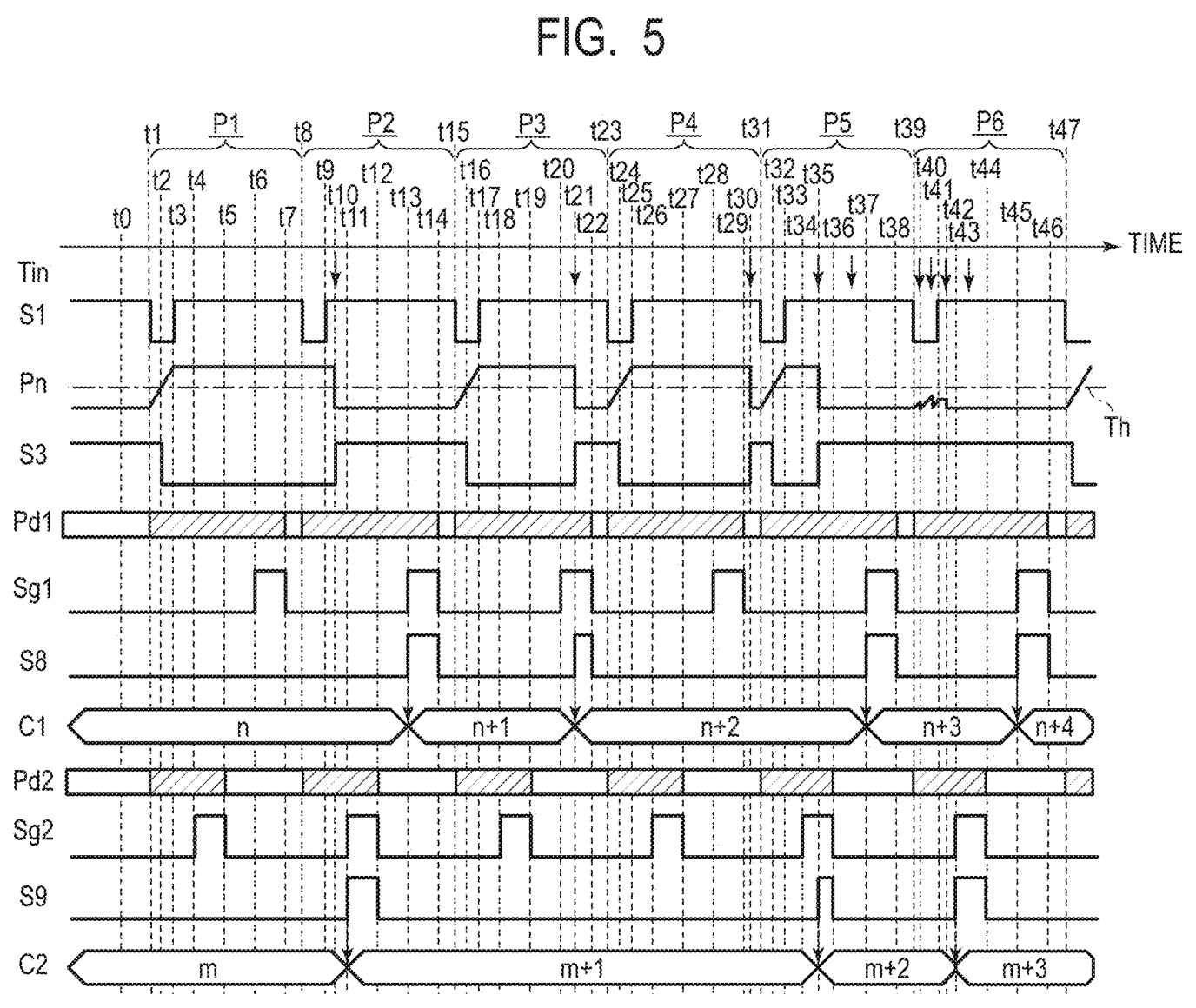

FIG. 5 is a timing chart showing the operation of the counter 551 and the counter 552 according to the first embodiment. Each of the periods P1 to P6 corresponds to one period of the periodic signal S1. FIG. 5 shows: the timing Tin of the incidence of photons in the periods P1 to P6 to the SPAD 510; the periodic signal S1 input to the gate of the switch 520; the potential Pn of the node N1; the inverted signal S3 input to the node N2; the detection period Pd1 of photons through the circuit 530; the periodic signal Sg1 from the delay unit 91; the detection signal S8 output from the circuit 530; the count value C1 output from the counter 551; the detection period Pd2 of photons through the circuit 540; the periodic signal Sg2 from the delay unit 92; the detection signal S9 output from the circuit 540; and the count value C2 output from the counter 552.

At time to before the period P1, the periodic signal S1 is at a high level, while the period signals Sg1 and Sg2 are at a low level. Therefore, at time to, the detection signal S8 and the detection signal S9 are at a low level. At time t0, the potential Pn is lower than a logical threshold Th, and the inverted signal S3 is at a high level. At time to, the count value C1 indicates a number "n" and the count value C2 indicates a number "m".

Since the periodic signal S1 is at a high level from the time t0 to the start time t1 of the period P1, the switch 520 is maintained in the OFF state. Therefore, during the period from the time t0 to the time t1, the SPAD 510 is not charged, and the potential Pn is maintained below the logical threshold Th. As a result, the inverted signal S3 is maintained at a high level during the period from the time t0 to the time t1. On the other hand, since the periodic signal Sg1 and the periodic signal Sg2 are at a low level during the period from the time t0 to the time t1, the detection signal S8 and the detection signal S9 are maintained at a low level.

At time t1, the periodic signal S1 transitions from a high level to a low level, and the switch 520 turns from the OFF state to the ON state. When the switch 520 is turned on, charging of the SPAD 510 is started, and the detection period Pd1 and the detection period Pd2 in the period P1 simultaneously start. Since the periodic signal S1 is maintained at a low level during the period from the time t1 to the time t2, the switch 520 is maintained in the ON state. Therefore, the SPAD 510 is charged during the period from time t1 to time t2, but the potential Pn does not exceed the logical threshold Th during the period from time t1 to time t2. As a result, the inverted signal S3 is maintained at a high level during the period from time t1 to time t2. On the other hand, since the periodic signal Sg1 and the periodic signal Sg2 are at a low level during the period from the time t1 to the time t2, the detection signal S8 and the detection signal S9 are maintained at a low level.

At time t2, the potential Pn reaches the logical threshold Th, and the inverted signal S3 transitions from a high level to a low level. Since the periodic signal S1 is maintained at a low level during the period from the time t2 to the time t3, the switch 520 is maintained in the ON state. That is, since the SPAD 510 is continuously charged, the potential Pn rises beyond the logical threshold Th during the period from the time t2 to the time t3. Therefore, the inverted signal S3 is maintained at a low level during the period from time t2 to time t3. In the period from time t2 to time t3, the periodic signal Sg1 and the periodic signal Sg2 are at a low level. As a result, during the period from the time t2 to the time t3, the detection signal S8 and the detection signal S9 are maintained at a low level.

At time t3, the periodic signal S1 transitions from a low level to a high level, and the switch 520 turns from the ON state to the OFF state. When the switch 520 turns to the OFF state, charging of the SPAD 510 is stopped. That is, the rise of the potential Pn stops. Since the periodic signal S1 is maintained at a high level during the period from the time t3 to the time t4, the switch 520 is maintained in the OFF state. Therefore, the SPAD 510 is not charged during the period from the time t3 to the time t4, the potential Pn is maintained to the potential at the time t3, and the inverted signal S3 is maintained at a low level. In addition, during the period from the time t3 to the time t4, the periodic signal Sg1 and the periodic signal Sg2 are at a low level. Therefore, during the period from the time t3 to the time t4, the detection signal S8 and the detection signal S9 are maintained at a low level.

At time t4, the periodic signal Sg2 transitions from a low level to a high level, and the periodic signal Sg2 is maintained at a high level during the period from time t4 to time t5. Since the periodic signal S1 is maintained at a high level during the period from the time t4 to the time t5, the switch 520 is maintained in the OFF state. Therefore, the SPAD 510 is not charged during the period from the time t4 to the time t5, the potential Pn is maintained to the potential at the time t4, and the inverted signal S3 is maintained at a low level. During the period from time t4 to time t5, the periodic signal Sg1 is at a low level. Therefore, during the period from the time t4 to the time t5, the detection signal S8 and the detection signal S9 are maintained at a low level.

At time t5, the periodic signal Sg2 transitions from a high level to a low level, and the detection period Pd2 in the period P1 ends. During the period from the time t5 to the time t6, the periodic signal Sg2 is maintained at a low level. Since the periodic signal S1 is maintained at a high level during the period from the time t5 to the time t6, the switch 520 is maintained in the OFF state. Therefore, the SPAD 510 is not charged during the period from the time t5 to the time t6, the potential Pn is maintained at the potential at the time t5, and the inverted signal S3 is maintained at a low level. During the period from time t5 to time t6, the periodic signal Sg1 is at a low level. Therefore, during the period from the time t5 to the time t6, the detection signal S8 and the detection signal S9 are maintained at a low level.

At time t6, the periodic signal Sg1 transitions from a low level to a high level, and the periodic signal Sg1 is maintained at a high level during the period from time t6 to time t7. Since the periodic signal S1 is maintained at a high level during the period from the time t6 to the time t7, the switch 520 is maintained in the OFF state. Therefore, the SPAD 510 is not charged during the period from the time t6 to the time t7, the potential Pn is maintained to the potential at the time t6, and the inverted signal S3 is maintained at a low level. During the period from time t6 to time t7, the periodic signal Sg2 is at a low level. Therefore, during the period from the time t6 to the time t7, the detection signal S8 and the detection signal S9 are maintained at a low level.

At time t7, the periodic signal Sg1 transitions from a high level to a low level, and the detection period Pd1 in the period P1 ends. During the period from the time t7 to the time t8, the periodic signal Sg1 is maintained at a low level. Since the periodic signal S1 is maintained at a high level during the period from the time t7 to the time t8, the switch 520 is maintained in the OFF state. Therefore, the SPAD 510 is not charged during the period from the time t7 to the time t8, the potential Pn is maintained to the potential at the time t7, and the inverted signal S3 is maintained at a low level. During the period from time t7 to time t8, the periodic signal Sg2 is at a low level. Therefore, during the period from the time t7 to the time t8, the detection signal S8 and the detection signal S9 are maintained at a low level.

At time t8, the period P1 ends, and at the same time, the period P2 starts. In the following descriptions, the same contents as the operation of each component already described above and the change of each signal already described above may be omitted or simplified.

The operation of each component and the change of each signal at time t8 are same as the operation of each component and the change of each signal at time t1. During the period from the time t8 to the time t9, the switch 520 is in the ON state. Thus, although the SPAD 510 may be charged, the SPAD 510 has not performed an avalanche multiplication operation in the immediately preceding period P1. Therefore, the potential Pn is maintained to the potential at the time t8 in the period from the time t8 to the time t9. That is, the potential Pn is maintained at the logical threshold Th or more during the period from the time t8 to the time t9, and the inverted signal S3 is maintained at a low level. Therefore, the detection signal S8 and the detection signal S9 are maintained at a low level during the period from the time t8 to the time t9.

The operation of each component and the change of each signal during the period from time t9 to time t10 are same as the operation of each component and the change of each signal during the period from time t3 to time t4. At time t10, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. Since the periodic signal S1 is maintained at a high level during the period from time t10 to time t11, the switch 520 is maintained in the OFF state. Therefore, during the period from the time t10 to the time t11, the potential Pn is maintained at a potential lower than the logical threshold Th at the time t10, and the inverted signal S3 is maintained at a high level. On the other hand, during the period from time t10 to time t11, the periodic signal Sg1 and the periodic signal Sg2 are at a low level. Therefore, during the period from time t10 to time t11, the detection signal S8 and the detection signal S9 are maintained at a low level.

At time t11, the periodic signal Sg2 transitions from a low level to a high level. At time t11, the inverted signal S3 is at a high level. Thus, the detection signal S9 transitions from a low level to a high level at time t11. In response to the transition of the detection signal S9 to a high level, an increment process is executed in the counter 552. That is, the counter 552 updates the count value from m to m+1 at time t11. On the other hand, since the periodic signal Sg1 is at a low level at the time t11, the detection signal S8 is at a low level at the time t11. Therefore, at time t11, the increment process by the counter 551 is not executed, and the count value held by the counter 551 is maintained at n. During the period from time t11 to time t12, the periodic signal Sg2 is maintained at a high level. Since the periodic signal S1 is maintained at a high level during the period from time t11 to time t12, the switch 520 is maintained in the OFF state. Therefore, the SPAD 510 is not charged during the period from the time t11 to the time t12, the potential Pn is maintained to the potential at the time t11, and the inverted signal S3 is maintained at a high level. As a result, the detection signal S9 is maintained at a high level. On the other hand, during the period from time t11 to time t12, the periodic signal Sg1 is maintained at a low level. Therefore, during the period from time t11 to time t12, the detection signal S8 is maintained at a low level.

At time t12, the periodic signal Sg2 transitions from a high level to a low level. In response to the transition of the periodic signal Sg2 to a low level, the detection signal S9 transitions from a high level to a low level at time t12. Since the periodic signal S1 is maintained at a high level during the period from the time t12 to the time t13, the switch 520 is maintained in the OFF state. Therefore, the SPAD 510 is not charged during the period from the time t12 to the time t13, the potential Pn is maintained to the potential at the time t12, and the inverted signal S3 is maintained at a high level. On the other hand, during the period from the time t12 to the time t13, the periodic signal Sg1 and the periodic signal Sg2 are maintained at a low level. Therefore, during the period from the time t12 to the time t13, the detection signal S8 and the detection signal S9 are maintained at a low level.

At time t13, the periodic signal Sg1 transitions from a low level to a high level. At time t13, the inverted signal S3 is at a high level. Thus, the detection signal S8 transitions from a low level to a high level at time t13. In response to the transition of the detection signal S8 to a high level, an increment process is executed in the counter 551. That is, the counter 551 updates the count value from n to n+1 at time t13. On the other hand, since the periodic signal Sg2 is at a low level at the time t13, the detection signal S9 is at a low level at the time t13. Therefore, at time t13, the increment process by the counter 552 is not executed, and the count value held by the counter 552 is maintained at m+1. During the period from the time t13 to the time t14, the periodic signal Sg1 is maintained at a high level. Since the periodic signal S1 is maintained at a high level during the period from the time t13 to the time t14, the switch 520 is maintained in the OFF state. Therefore, the SPAD 510 is not charged during the period from the time t13 to the time t14, the potential Pn is maintained to the potential at the time t13, and the inverted signal S3 is maintained at a high level. As a result, the detection signal S8 is maintained at a high level. On the other hand, during the period from time t13 to time t14, the periodic signal Sg2 is maintained at a low level. Therefore, during the period from time t13 to time t14, the detection signal S9 is maintained at a low level.

At time t14, the periodic signal Sg1 transitions from a high level to a low level. In response to the transition of the periodic signal Sg1 to a low level, the detection signal S8 transitions from a high level to a low level at time t14. Since the periodic signal S1 is maintained at a high level during the period from the time t14 to the time t15, the switch 520 is maintained in the OFF state. Therefore, the SPAD 510 is not charged during the period from the time t14 to the time t15, the potential Pn is maintained to the potential at the time t14, and the inverted signal S3 is maintained at a high level. On the other hand, during the period from the time t14 to the time t15, the periodic signal Sg1 and the periodic signal Sg2 are maintained at a low level. Therefore, during the period from the time t14 to the time t15, the detection signal S8 and the detection signal S9 are maintained at a low level.

At time t15, the period P2 ends, and at the same time, the period P3 starts. In the following descriptions, the same or already described contents as the operation of the respective components and the change of the respective signals in the period P1 to the period P2 may be omitted or simplified.

The operation and the change of each signal in the period from time t15 to time t20 are same as those in the period from time t1 to time t6. At time t20, the periodic signal Sg1 transitions from a low level to a high level, and the periodic signal Sg1 is maintained at a high level during the period from time t20 to time t21. Since the periodic signal S1 is maintained at a high level during the period from the time t20 to the time t21, the switch 520 is maintained in the OFF state. Therefore, the SPAD 510 is not charged during the period from the time t20 to the time t21, the potential Pn is maintained to the potential at the time t20, and the inverted signal S3 is maintained at a low level. In addition, the periodic signal Sg2 is at a low level during the period from the time t20 to the time t21. Therefore, during the period from the time t20 to the time t21, the detection signal S8 and the detection signal S9 are maintained at a low level.

At time t21, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. The periodic signal Sg1 is at a high level at time t21. Therefore, at time t21, the detection signal S8 transitions from a low level to a high level. In response to the transition of the detection signal S8 to a high level, an increment process is executed in the counter 551.

That is, the counter 551 updates the count value from n+1 to n+2 at time t21. On the other hand, since the periodic signal Sg2 is at a low level at the time t21, the detection signal S9 is at a low level at the time t21. Therefore, the increment process is not executed by the counter 552 at the time t21. Since the periodic signal S1 is maintained at a high level during the period from the time t21 to the time t22 for which the count value held by the counter 552 is maintained at m+1, the switch 520 is maintained in the OFF state. As a result, during the period from the time t21 to the time t22, the potential Pn is maintained to a potential lower than the logical threshold Th at the time t21, and the inverted signal S3 is maintained at a high level. Further, the periodic signal Sg1 is at a high level during the period from time t21 to time t22. Therefore, during the period from time t21 to time t22, the detection signal S8 is maintained at a high level. On the other hand, during the period from time t21 to time t22, the periodic signal Sg2 is at a low level. Therefore, during the period from time t21 to time t22, the detection signal S9 is maintained at a low level. The operation of each component and the change of each signal during the period from time t22 to time t23 are same as the operation of each component and the change of each signal during the period from time t14 to time t15.

At time t23, the period P3 ends, and at the same time, the period P4 starts. The operation of each component and the change of each signal during the period from time t23 to time t29 are the same as the operation of each component and the change of each signal during the period from time t1 to time t7.

At time t29, the periodic signal Sg1 transitions from a high level to a low level, and the periodic signal Sg1 is maintained at a low level during the period from time t29 to time t30. Since the periodic signal S1 is maintained at a high level during the period from the time t29 to the time t30, the switch 520 is maintained in the OFF state. Therefore, the SPAD 510 is not charged during the period from the time t29 to the time t30, the potential Pn is maintained to the potential at the time t29, and the inverted signal S3 is maintained at a low level. During the period from the time t29 to the time t30, the periodic signal Sg2 is at a low level. Therefore, during the period from the time t29 to the time t30, the detection signal S8 and the detection signal S9 are maintained at a low level.

At time t30, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. On the other hand, the periodic signal Sg1 and the periodic signal Sg2 are at a low level at time t30. Therefore, at time t30, the detection signal S8 and the detection signal S9 are at a low level. As a result, the counter 551 and the counter 5522 do not perform the increment process due to the incidence of photon at the time t30. That is, the count value held by the counter 551 is maintained at n+2, and the count value held by the counter 552 is maintained at m+1.

Since the periodic signal S1 is maintained at a high level during the period from the time t30 to the time t31, the switch 520 is maintained in the OFF state. Therefore, the potential Pn is maintained to a potential lower than the logical threshold Th at the time t30, and the inverted signal S3 is maintained at a high level. On the other hand, the periodic signal Sg1 and the periodic signal Sg2 are at a low level during the period from the time t30 to the time t31. Therefore, during the period from the time t30 to the time t31, the detection signal S8 and the detection signal S9 are maintained at a low level.

At time t31, the period P4 ends, and at the same time, the period P5 starts. The operation of each component and the change of each signal in the period from time t31 to time t34 are the same as the operation of each component and the change of each signal in the period from time t1 to time t4.

At time t34, the periodic signal Sg2 transitions from a low level to a high level, and the periodic signal Sg2 is maintained at a high level during the period from time t34 to time t35. Since the periodic signal S1 is maintained at a high level during the period from the time t34 to the time t35, the switch 520 is maintained in the OFF state. Therefore, the SPAD 510 is not charged during the period from the time t34 to the time t35, the potential Pn is maintained to the potential at the time t34, and the inverted signal S3 is maintained at a low level. During the period from time t34 to time t35, the periodic signal Sg1 is at a low level. Therefore, during the period from the time t34 to the time t35, the detection signal S8 and the detection signal S9 are maintained at a low level.

At time t35, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. The periodic signal Sg2 is at a high level at time t35. Therefore, at time t35, the detection signal S9 transitions from a low level to a high level. In response to the transition of the detection signal S9 to a high level, an increment process is executed in the counter 552.

That is, the counter 552 updates the count value from m+1 to m+2 at time t35. On the other hand, since the periodic signal Sg1 is at a low level at the time t35, the detection signal S8 is at a low level at the time t35. Therefore, at time t35, the increment process is not executed by the counter 551, and the count value held by the counter 551 is maintained at n+2. Since the periodic signal S1 is maintained at a high level during the period from the time t35 to the time t36, the switch 520 is maintained in the OFF state. Therefore, during the period from the time t35 to the time t36, the potential Pn is maintained at a potential lower than the logical threshold Th at the time t35, and the inverted signal S3 is maintained at a high level. Further, the periodic signal Sg2 is at a high level during the period from time t35 to time t36. Therefore, during the period from time t35 to time t36, the detection signal S9 is maintained at a high level. On the other hand, during the period from time t35 to time t36, the periodic signal Sg1 is at a low level. Therefore, during the period from time t35 to time t36, the detection signal S8 is maintained at a low level.

The operation of each component and the change of each signal during the period from time t36 to time t39 are same as the operation of each component and the change of each signal during the period from time t12 to time t15. During the period from time t36 to time t37, a photon enters the SPAD 510. However, the SPAD 510 has already performed the avalanche multiplication operation by the incidence of photon at the time t35. Further, the SPAD 510 is not charged during the period from the time t35 to the time t37. Therefore, the potential Pn, the inverted signal S3, the detection signal S8, and the detection signal S9 are not affected by the incidence of photon during the period from the time t36 to the time t37.

At time t39, the period P5 ends, and at the same time, the period P6 starts. The operation of each component and the change of each signal at time t39 are the same as the operation of each component and the change of each signal at time t1. Since the periodic signal S1 is maintained at a low level during the period from the time t39 to the time t40, the switch 520 is maintained in the ON state. Therefore, although the SPAD 510 is charged during the period from the time t39 to the time t40, the potential Pn does not exceed the logical threshold Th during the period from the time t39 to the time t40. As a result, the inverted signal S3 is maintained at a high level during the period from the time t39 to the time t40. On the other hand, since the periodic signal Sg1 and the periodic signal Sg2 are at a low level during the period from the time t39 to the time t40, the detection signal S8 and the detection signal S9 are maintained at a low level.

At time t40, a photon enters the SPAD 510. The incidence of photon causes avalanche multiplication in the SPAD 510. The potential Pn decreases according to the avalanche multiplication operation of the SPAD 510. The SPAD 510 is charged again during the period from the time t40 to the time t41, but the potential Pn is maintained below the logical threshold Th during the period from the time t40 to the time t41. Therefore, the inverted signal S3 is maintained at a high level during the period from the time t40 to the time t41.

On the other hand, since the periodic signal Sg1 and periodic signal Sg2 are at a low level during the period from the time t40 to the time t41, the detection signal S8 and detection signal S9 are at a low level during the period from the time t40 to the time t41. Therefore, the counter 551 and the counter 551 do not perform the increment process during the period from the time t40 to the time t41. That is, during the period from the time t40 to the time t41, the count value held by the counter 551 is maintained at n+3, and the count value held by the counter 552 is maintained at m+2. During the period from time t40 to time t41, a photon further enters the SPAD 510, and the avalanche multiplication occurs in the SPAD 510. In this case, as in the case where a single photon enters the SPAD 510 during the period from the time t39 to the time t41, the potential Pn is lower than the logical threshold Th during the period from the time t39 to the time t41. That is, the counter 551 and the counter 552 operate independently of the number of times of photons entering the SPAD 510 during the period from the time t39 to the time t41.

At time t41, the periodic signal S1 transitions from a low level to a high level, and the switch 520 turns from the ON state to the OFF state. Since the periodic signal S1 is maintained at a high level during the period from the time t41 to the time t42, the switch 520 is maintained in the OFF state. Therefore, the potential Pn is maintained to a potential lower than the logical threshold Th at the time t41, and the inverted signal S3 is maintained at a high level. On the other hand, during the period from time t41 to time t42, the periodic signal Sg1 and the periodic signal Sg2 are at a low level. Therefore, during the period from the time t41 to the time t42, the detection signal S8 and the detection signal S9 are maintained at a low level.

At time t42, a photon enters the SPAD 510. The incidence of photon causes avalanche multiplication in the SPAD 510. In response to the avalanche multiplication operation of the SPAD 510, the potential Pn decreases and remains to be a potential lower than the logical threshold Th. Therefore, the inverted signal S3 is maintained at a high level at time t42. Since the periodic signal S1 is maintained at a high level during the period from the time t42 to the time t43, the switch 520 is maintained in the OFF state. As a result, during the period from the time t42 to the time t43, the potential Pn is maintained to a potential lower than the logical threshold Th at the time t42, and the inverted signal S3 is maintained at a high level. On the other hand, during the period from time t42 to time t43, the periodic signal Sg1 and the periodic signal Sg2 are at a low level. Therefore, during the period from the time t42 to the time t43, the detection signal S8 and the detection signal S9 are maintained at a low level.

The operation of each component and the change of each signal during the period from time t43 to time t47 are same as the operation of each component and the change of each signal during the period from time t11 to time t15. At time t47, the period P6 ends. During the period from time t43 to time t44, a photon enters the SPAD 510. However, the SPAD 510 has already performed the avalanche multiplication operation by the incidence of photon at the time t42, and the SPAD 510 is not charged during the period from the time t42 to the time t44. Therefore, the potential Pn, the inverted signal S3, the detection signal S8, and the detection signal S9 are not affected by the incidence of photon during the period from the time t43 to the time t44.

As shown in FIG. 5, the circuit 530 generates the detection signal S8 based on the periodic signal Sg1 and the change in voltage of the SPAD 510 from the time at which the switch 520 turns to the ON state to the time at which the periodic signal Sg1 transitions from a high level to a low level. When light (photon) enters the SPAD 510, the detection signal S8 transitions from a low level to a high level within a period in which the periodic signal Sg1 is at a high level. The counter 551 increments the count value C1 at the time when the detection signal S8 transitions from a low level to a high level. On the other hand, in each of the periods P1 to P6, the circuit 530 does not generate the detection signal S8 having a high level based on the change in the voltage of the SPAD 510 after the time when the periodic signal Sg1 transitions from a high level to a low level. That is, only photons entering the SPAD 510 during a period from the time when the switch 520 turns to the ON state to the time when the periodic signal Sg1 transitions from a high level to a low level are to be incremented by the count value C1. Thus, the counter 551 increments the count value C1 based on the photons entering the SPAD 510 at the time t10 of the period P2, the time t21 of the period P3, the time t35 of the period P5, and the time t40 of the period P6. On the other hand, in each of the periods P1 to P6, photons entering the SPAD 510 after the time when the periodic signal Sg1 transitions from a high level to a low level are not to be incremented by the count value C1. As a result, the counter 551 does not increment the count value C1 based on the photons entering the SPAD 510 at the time t30 of the period P4. That is, the photon detection period Pd1 in association with the detection signal S8 transmitted from the circuit 530 corresponds to a period from the time at which the periodic signal S1 transitions to a low level to the time at which the periodic signal Sg1 transitions from a high level to a low level (the hatched portion of Pd1 shown in FIG. 5).

Similar to the circuit 530, the circuit 540 generates the detection signal S9 based on the periodic signal Sg2 and the change in voltage of the SPAD 510 from the time at which the switch 520 turns to the ON state to the time at which the periodic signal Sg2 transitions from a high level to a low level. That is, when light (photon) enters the SPAD 510, the detection signal S9 transitions from a low level to a high level within a period in which the periodic signal Sg2 is at a high level. The counter 552 increments the count value C2 at the time when the detection signal S9 transitions from a low level to a high level. On the other hand, in each of the periods P1 to P6, the circuit 540 does not generate the detection signal S9 having a high level based on the change in voltage of the SPAD 510 after the time when the periodic signal Sg2 transitions from a high level to a low level. That is, only photons entering the SPAD 510 during a period from the time when the switch 520 turns to the ON state to the time when the periodic signal Sg2 transitions from a high level to a low level are to be incremented by the count value C2. The periodic signal Sg2 has a predetermined phase difference with respect to the periodic signal Sg1. Therefore, in each of the periods P1 to P6, the time at which the periodic signal Sg2 transitions from a high level to a low level is earlier than the time at which the periodic signal Sg1 transitions from a high level to a low level. That is, the detection period of photons by the circuit 540 in each of the periods P1 to P6 is shorter than the detection period of photons by the circuit 530. The counter 552 increments the count value C2 based on the photons entering the SPAD 510 at the time t10 of the period P2, at the time t35 of the period P5, and at the time t40 of the period P6. On the other hand, in each of the periods P1 to P6, the photons entering the SPAD 510 after the time when the periodic signal Sg2 transitions from a high level to a low level are not to be incremented by the count value C2. That is, the counter 552 does not increment the count value C2 based on the photons entering the SPAD 510 at the time t21 of the period P3 and at the time t30 of the period P4. Therefore, the photon detection period Pd2 in association with the detection signal S9 transmitted from the circuit 540 corresponds to a period from the time when the periodic signal S1 transitions to a low level to the time when the periodic signal Sg2 transitions from a high level to a low level (the hatched portion of Pd2 shown in FIG. 5). In each of the periods P5 and P6, a photon enters the SPAD 510 twice or more. However, the counters 551 and 552 do not increment the count values C1 and C2 multiple times, but the counters 551 and 552 increase the count values C1 and C2 only by one.

The photoelectric conversion device 100 according to the present disclosure can provide different photon detection periods based on one signal. Specifically, the periodic signals Sg1 and Sg2 having different phases from each other are input to the circuit 530 and the circuit 540, respectively, based on one cycle signal S2 from the driving controller 60. The photon detection period is determined by the phase difference between the periodic signal S2 and the periodic signals Sg1, Sg2. In other words, in each of the periods P1 to P6 corresponding to one period of the periodic signal S1, the time when the periodic signal Sg1 transitions from a high level to a low level is different from the time when the periodic signal Sg2 transitions from a high level to a low level, which may be changed depending on the phase difference between the periodic signal Sg1 and the periodic signal Sg2. According to the present embodiment, the time at which the periodic signal Sg1 transitions from a high level to a low level is later than the time at which the periodic signal Sg2 transitions from a high level to a low level. Therefore, the detection period of photons counted by the counter 551 is longer than the detection period of photons counted by the counter 552. Consequently, the detection sensitivity to photons indicated by the detection signal S8 that is generated based on the periodic signal S2 is higher than the detection sensitivity to photons indicated by the detection signal S9 that is generated based on the common periodic signal S2.

The photoelectric conversion device according to the present disclosure can obtain different photon detection sensitivities based on one periodic signal without requiring gating signals having different pulse widths for each counter. That is, using multiple signals whose phase is controlled based on one signal allows to count photons with various sensitivities without complicating the circuit configuration of the photoelectric conversion device. Thus, the present disclosure provides the technique for further simplifying the circuit configuration of the photoelectric conversion device that is capable of counting photons with multiple sensitivities.

The photoelectric conversion device according to the present disclosure may further generate a signal having a phase different from that of the periodic signals Sg1 and Sg2, and counts photons entering the SPAD 510 based on the generated signal. That is, the photoelectric conversion device according to the present disclosure can count photons with various sensitivities without complicating the circuit configuration. Thus, the present disclosure provides the technique for not only simplifying the circuit configuration of the photoelectric conversion device, but also enhancing the dynamic range of the photoelectric conversion device.

Second Embodiment

Figure 6:
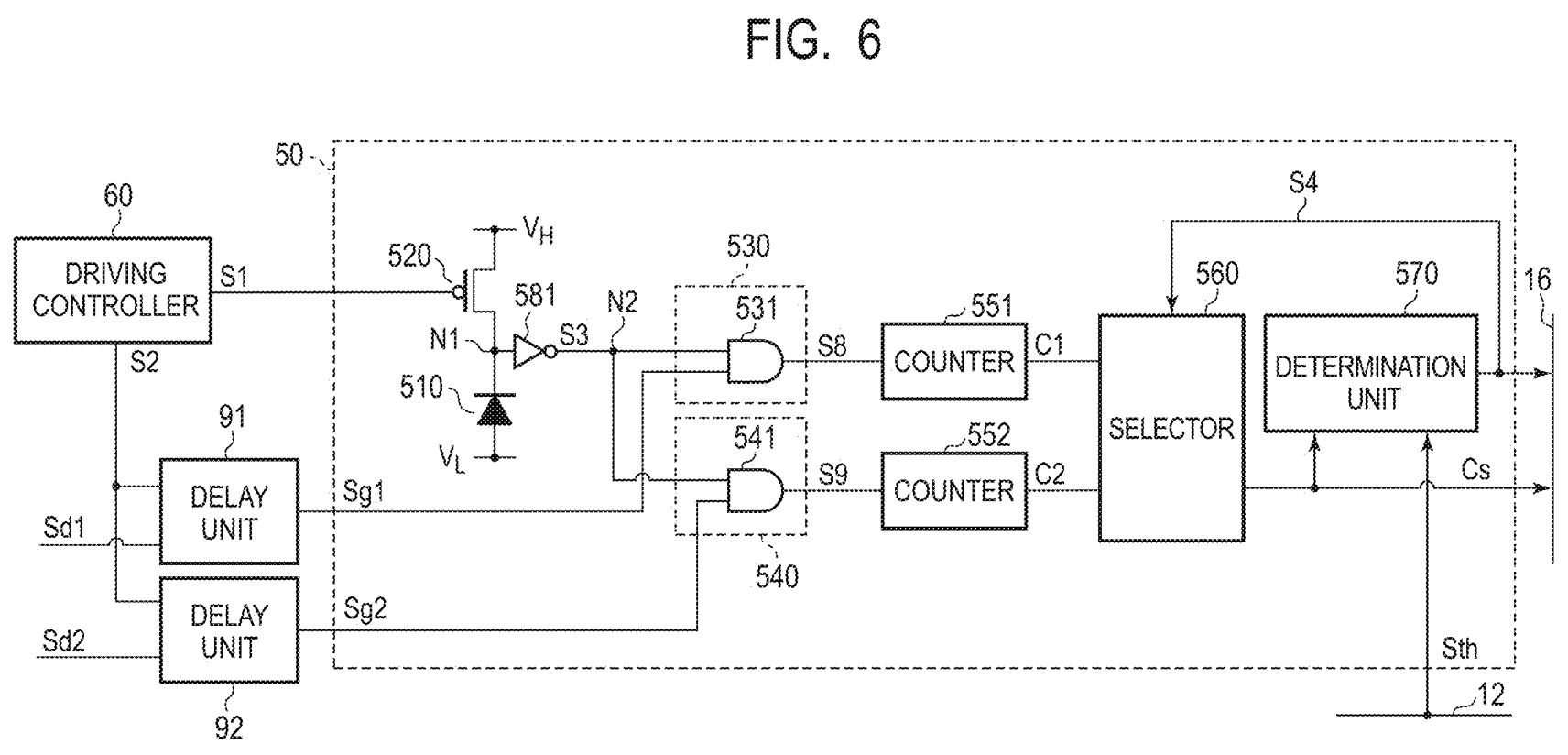

FIG. 6 is a circuit diagram of the pixel unit 50 according to the second embodiment. The pixel unit 50 according to the present embodiment is different from the pixel unit 50 of the first embodiment because the pixel unit 50 according to the present embodiment further includes a determination unit 570 that determines whether or not the count values C1, C2 exceed a threshold value and specifies the count value to be selected by the selector 560 based on a result of the determination.

The determination unit 570 evaluates the count value output from the selector 560 based on a threshold signal Sth. As shown in FIG. 6, the determination unit 570 is connected to the selector 560, and receives the count value Cs output from the selector 560. The determination unit 570 receives the threshold signal Sth output from the register block 40 via the setting signal line 12. The determination unit 570 compares the count value Cs with a threshold value indicated by the threshold signal Sth. The determination unit 570 outputs the selection signal S4 to the selector 560 based on a result of comparison between the count value Cs and the threshold value. The selector 560 selects the value Cs based on the selection signal S4 and outputs the value Cs to the digital processor 70 via the output line 16. The determination unit 570 outputs the selection signal S4 to the digital processor 70 via the output line 16 to identify the selected count value and to identify the circuit that has generated the selected count value.

For example, if the count value Cs is equal to or greater than the threshold value indicated by the threshold signal Sth, the determination unit 570 generates the selection signal S4 to designate the count value C2 transmitted from the counter 552 whose photon detection period is relatively short. The selector 560 selects the count value C2 output from the counter 552 as the count value Cs based on the selection signal S4 transmitted from the determination unit 570, and outputs the count value Cs to the digital processor 70 via the output line 16. On the other hand, for example, if the count value Cs is less than the threshold value indicated by the threshold signal Sth, the determination unit 570 generates the selection signal S4 to designate the count value C1 transmitted from the counter 551 whose photon detection period is relatively long. The selector 560 selects the count value C1 output from the counter 551 as the count value Cs based on the selection signal S4 transmitted from the determination unit 570, and outputs the count value Cs to the digital processor 70 via the output line 16.

The number of bits that the threshold signal Sth has may be same as or different from the number of bits that the count value Cs has. For example, the determination unit 570 may compare one bit of a predetermined position of the threshold signal Sth with one bit of a predetermined position of the count value Cs, and may generate the selection signal S4 based on a result of the comparison. The number of bits that the selection signal S4 has can be determined based on the number of counters included in the pixel unit 50. For example, if the pixel unit 50 includes two counters, the selection signal S4 may be one bit. If the one-bit selection signal S4 indicates "0", the selector 560 may select the count value C1 output from the counter 551. If the one-bit selection signal S4 indicates "1", the selector 560 may select the count value C2 output from the counter 552. The determination unit 570 may set an initial value of the selection signal S4 to 0 (i.e., low level) or 1 (i.e., high level).

Figure 7A:
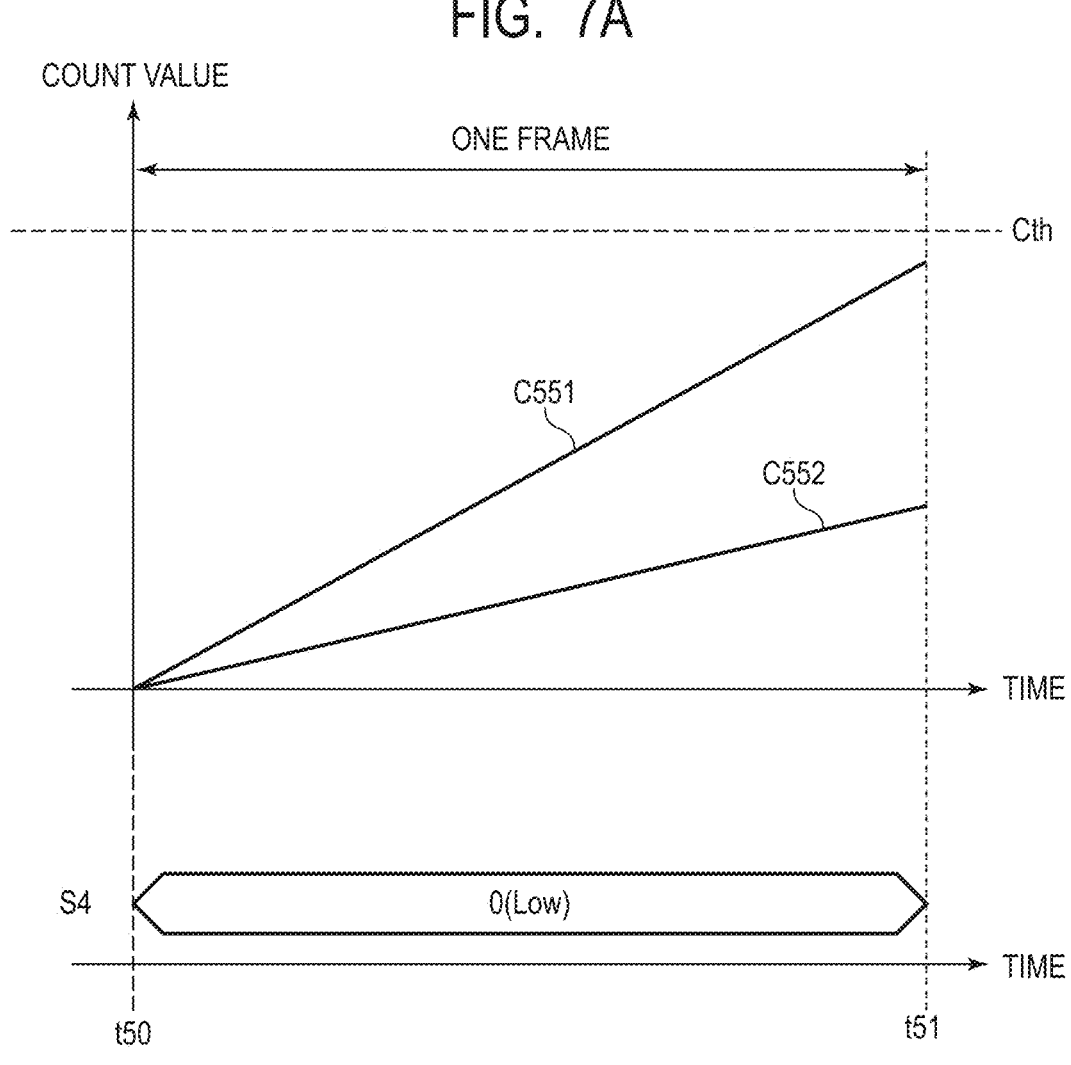
FIG. 7A illustrates a graph showing the output of the count value output by the counter according to the second embodiment.
Figure 7B:
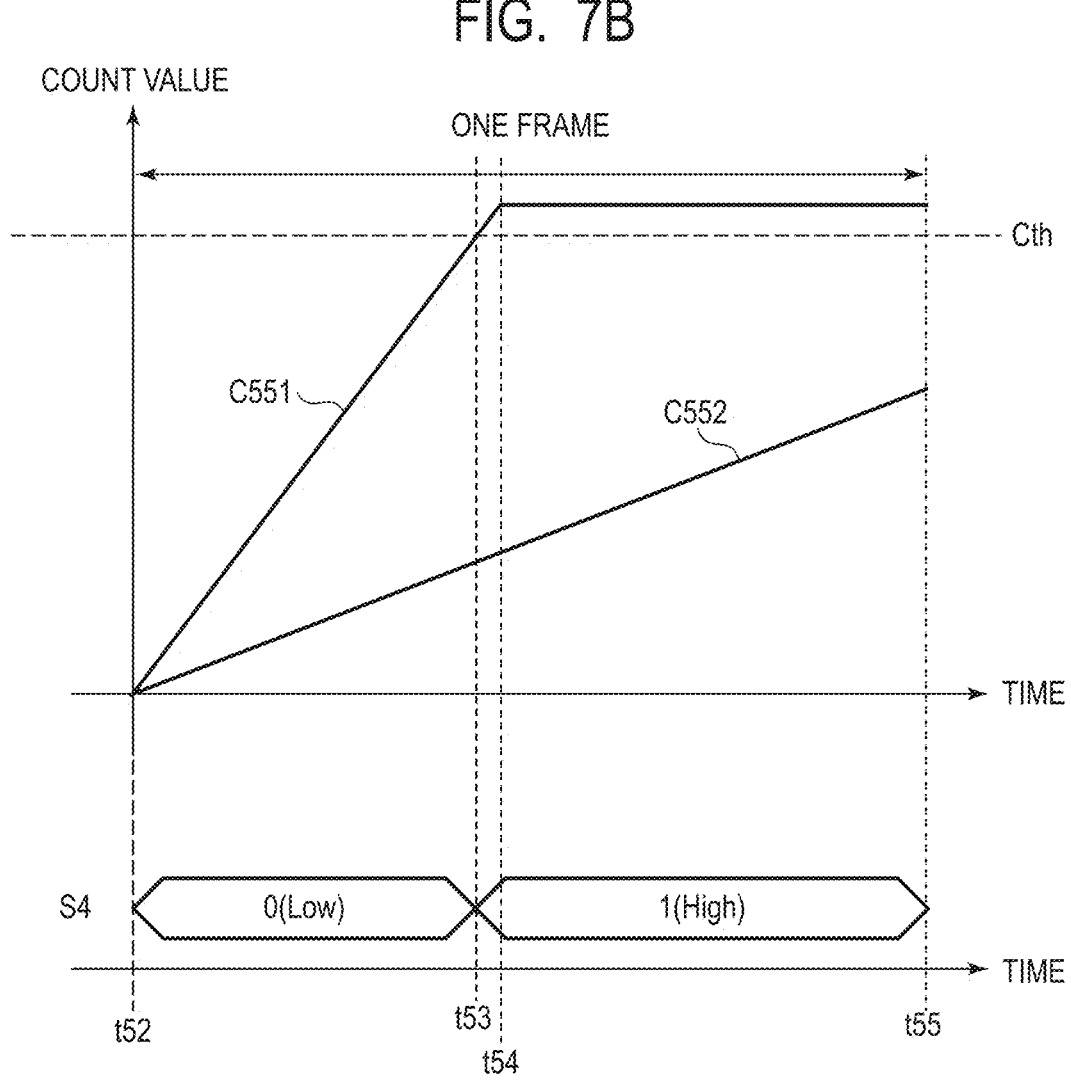
FIG. 7B is a graph showing the output of the count value output by the counter according to the second embodiment.

The operation of the determination unit 570 that determines the selection signal S4 based on a count value and a threshold value of the count value in one frame period will be described with reference to FIGS. 7A and 7B. FIGS. 7A and 7B are graphs showing count values output by the counter 551 and the counter 552 according to the second embodiment.

FIG. 7A shows a count value C551 counted by the counter 551 in a period from time t50 to time t51 corresponding to one frame period, a count value C552 counted by the counter 552 in the period from time t50 to time t51, a threshold value Cth of the count value indicated by the threshold signal Sth, and the selection signal S4 in the period from time t50 to time t51. In FIG. 7A, the photoelectric conversion device 100 performs the photon detection operation in an environment with relatively low illuminance compared to the case shown in FIG. 7B described later.

At time t50, the count values C551, C552 are reset, and the selection signal S4 indicates "0" (i.e., low level). During the period from the time t50 to the time t51, the count values C551, C552 are both less than the threshold value Cth. Therefore, the selection signal S4 output from the determination unit 570 is maintained at "0" (i.e., low level) in the period from the time t50 to the time t51 to specify the count value C551 obtained from the counter 551 that has relatively a long photon detection period.

FIG. 7B shows the count value C551 counted by the counter 551 in the period from time t52 to time t55 corresponding to one frame period, the count value C552 counted by the counter 552 in the period from time t52 to time t55, the threshold value Cth of the count value indicated by the threshold signal Sth, and the selection signal S4 in the period from time t52 to time t55. In FIG. 7B, the photoelectric conversion device 100 performs the photon detection operation in an environment with relatively high illuminance compared to the case shown in FIG. 7A.

At time t52, the count values C551, C552 are reset, and the selection signal S4 indicates "0" (i.e., low level). During a period from the time t52 to the time t53, the count values C551, C552 are both less than the threshold value Cth. Therefore, the selection signal S4 output from the determination unit 570 indicates "0" (i.e., low level) in the period from the time t52 to the time t53 to designate the count value C551 obtained from the counter 551 whose photon detection period is relatively long. At time t53, count value C551 reaches the threshold value Cth. In response to the count value C551 which has reached the threshold value Cth, the selection signal S4 is switched from "0" (i.e., low level) to "1" (i.e., high level) at time 53 to designate the count value C552 obtained from the counter 552 whose photon detection period is relatively short. The selection signal S4 switched to "1" (i.e., high level) is output from the determination unit 570 to the selector 560 within a period of the one frame (for example, at time t53).

The count values C551, C552 increase during a period from the time t53 to the time t54, and the count value C551 is saturated at the time t54. During the period from the time t54 to the time t55, the count value C551 stops increasing and is held at a constant value. On the other hand, the count value C552 keeps increasing during the period from time t54 to time t55. At time t55, the count value C551 is greater than or equal to threshold value Cth, and the count value C552 is less than the threshold value Cth. Therefore, the selection signal S4 output from the determination unit 570 is maintained at "1" (i.e., high level) in the period from the time t53 to the time t55 to designate the count value C552 obtained from the counter 552 whose photon detection period is relatively short. When the count value C552 exceeds the threshold value Cth at the time after the time t53, the selection signal S4 is maintained at "1" (i.e., high level) to output the count value C552 from the selector 560 as the count value Cs. The number of counters included in the pixel unit 50 according to the present disclosure is not limited to two. For example, in order to realize three or more different periods for detecting photons, the pixel unit 50 may include three or more delay units and three or more counters, and multiple threshold values Cth may be provided depending on the number of counters.

According to the present embodiment, the count value (pixel value) output from the pixel unit 50 is selected based on the count values output from multiple counters included in the pixel unit 50. That is, in the photoelectric conversion device according to the present embodiment, it is not necessary to generate a selection signal outside the pixel unit 50, and it is not necessary to input the selection signal to the pixel unit 50 either. Therefore, the present embodiment can further simplify the circuit configuration of the photoelectric conversion device 100, and can also suppress power consumption of the photoelectric conversion device 100. Further, the photoelectric conversion device 100 according to the present embodiment can suitably select the proper photon detection sensitivity according to the number of photons entering the SPAD.

Third Embodiment

Figure 8:
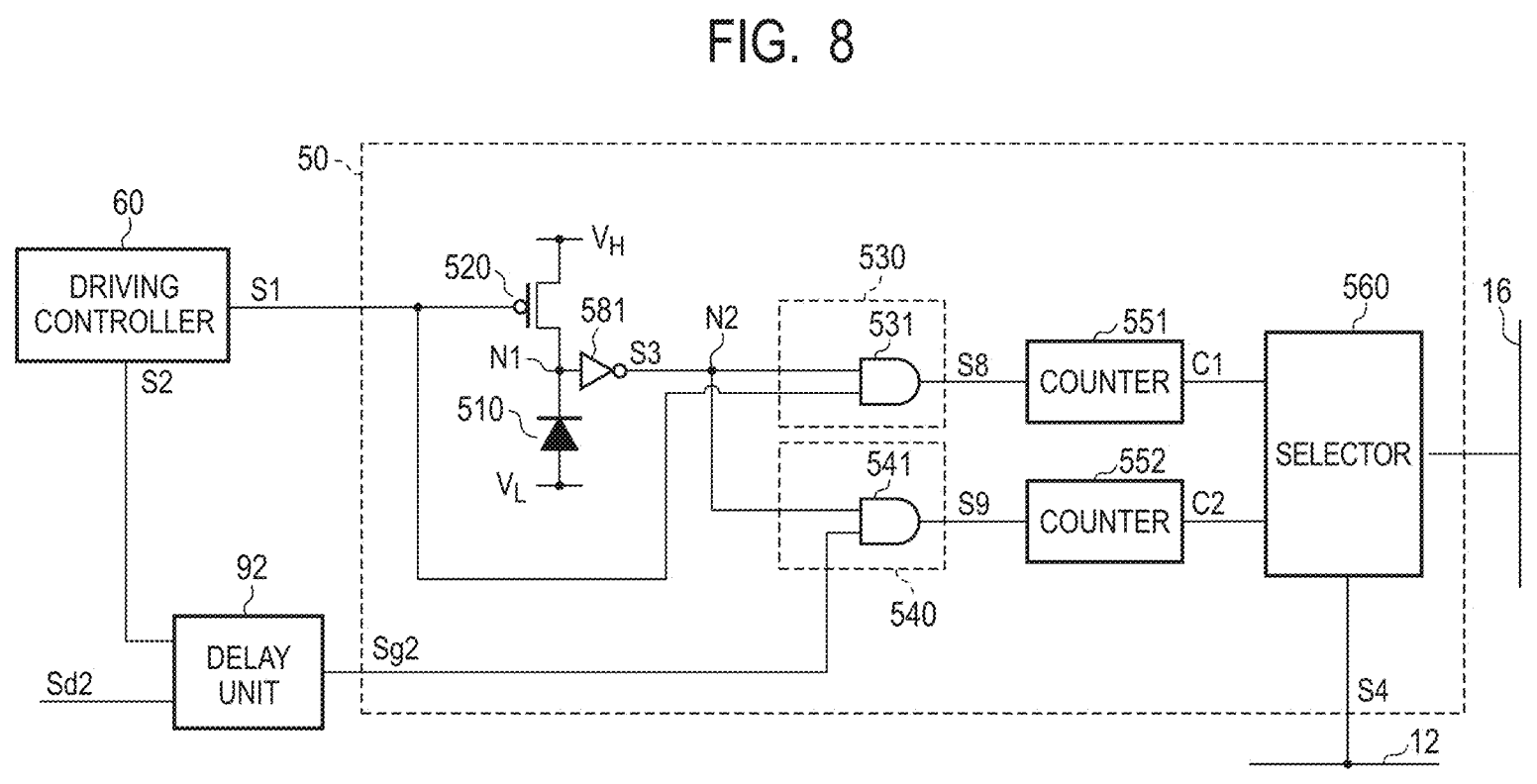

FIG. 8 is a circuit diagram of the pixel unit 50 according to the third embodiment. The pixel unit 50 of the present embodiment is different from the pixel unit 50 of the first embodiment because the detection signal S8 is generated based on the periodic signal S1 input to the switch 520. As shown in FIG. 8, the circuit 530 according to the present embodiment outputs the detection signal S8 indicating detection of photons in the SPAD 510 based on an AND operation of the inverted signal S3 at the node N2 and the periodic signal S1 (first periodic signal) from the driving controller 60. The circuit 530 outputs a result of the operation based on the inverted signal S3 and the periodic signal S1 to the counter 551 as the detection signal S8. Unlike the first and second embodiments, the pixel unit 50 of the present embodiment does not include the delay unit 91.

Figure 9:
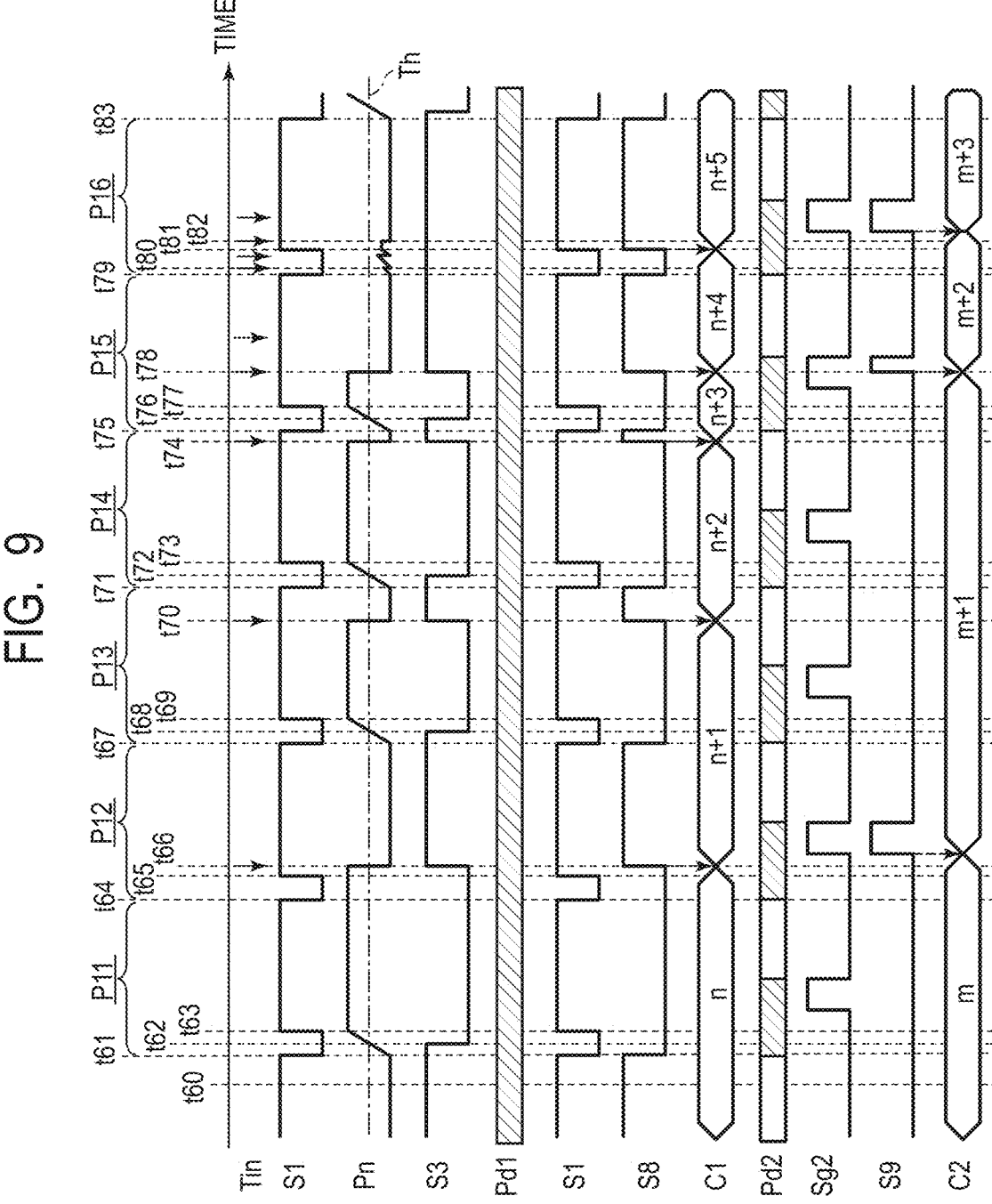
FIG. 9 is a timing chart showing the operation of the counter according to the third embodiment.

FIG. 9 is a timing chart showing the operation of the counter 551 and the counter 552 according to the third embodiment. Each of the periods P11 to P16 corresponds to one period of the periodic signal S1. FIG. 9 shows: the timing Tin indicating incidence of photons to the SPAD 510 in the periods P11 to P16; the periodic signal S1 input to the gate of the switch 520; the potential Pn of the node N1; the inverted signal S3 input to the node N2; the detection period Pd1 of photons through the circuit 530; the periodic signal S1 input to the circuit 530; the detection signal S8 output from the circuit 530; the count value C1 output from the counter 551; the detection period Pd2 of photons through the circuit 540; the periodic signal Sg2 from the delay unit 92; the detection signal S9 output from the circuit 540; and the count value C2 output from the counter 552. The operation of the counter 552 in the present embodiment is same as the operation of the counter 552 shown in FIG. 5 according to the first embodiment. Therefore, descriptions for the photon detection period Pd2 through the circuit 540, the periodic signal Sg2 from the delay unit 92, the detection signal S9 output from the circuit 540, and the count value C2 output from the counter 552 will be omitted.

At time t60 before the period P11, the periodic signal S1 is at a high level. At time t60, the potential Pn is lower than the logical threshold Th, and the inverted signal S3 is at a high level. Therefore, at time t60, the detection signal S8 is at a high level. At time t60, the count value C1 indicates a number "n".

Since the periodic signal S1 is at a high level from the time t60 to the start time t61 of the period P11, the switch 520 is maintained in the OFF state. Therefore, during the period from the time t60 to the time t61, the SPAD 510 is not charged, and the potential Pn is maintained below the logical threshold Th. Therefore, the inverted signal S3 is maintained at a high level during the period from the time t60 to the time t61. Since the periodic signal S1 is at a high level during the period from the time t60 to the time t61, the detection signal S8 is maintained at a high level.

At time t61, the periodic signal S1 transitions from a high level to a low level, and the switch 520 turns from the OFF state to the ON state. When the switch 520 is turned on, charging of the SPAD 510 is started, and the detection period Pd1 in the period P11 is started.

In response to the transition of the periodic signal S1 to a low level at the time t61, the detection signal S8 transitions from a high level to a low level. Since the periodic signal S1 is maintained at a low level during the period from the time t61 to the time t62, the switch 520 is maintained in the ON state. Although the SPAD 510 is charged during the period of time t61 to time t62, the potential Pn does not exceed the logical threshold Th during the period of time t61 to time t62. Therefore, the inverted signal S3 is maintained at a high level during the period from time t61 to time t62. On the other hand, since the periodic signal S1 is at a low level during the period from the time t61 to the time t62, the detection signal S8 is maintained at a low level.

At time t62, the potential Pn reaches the logical threshold Th, and the inverted signal S3 transitions from a high level to a low level. Since the periodic signal S1 is maintained at a low level during the period from the time t62 to the time t63, the switch 520 is maintained in the ON state. That is, since the SPAD 510 is continuously charged, the potential Pn rises beyond the logical threshold Th during the period from the time t62 to the time t63. Therefore, the inverted signal S3 is maintained at a low level during the period from the time t62 to the time t63. As a result, the detection signal S8 is maintained at a low level during the period from the time t62 to the time t63.

At time t63, the periodic signal S1 transitions from a low level to a high level, and the switch 520 turns from the ON state to the OFF state. When the switch 520 is turned to the OFF state, charging of the SPAD 510 is stopped. That is, the rise of the potential Pn stops.

Since the periodic signal S1 is maintained at a high level during the period from the time t63 to the time t64, the switch 520 is maintained in the OFF state. Therefore, the SPAD 510 is not charged during the period from the time t63 to the time t64, the potential Pn is maintained to the potential at the time t63, and the inverted signal S3 is maintained at a low level. As a result, during the period from time t63 to time t64, the detection signal S8 is maintained at a low level.

At time t64, the period P11 ends, and at the same time, the period P12 starts. In the following descriptions, the same contents as the operation executed by each component and the change of each signal already described above may be omitted or simplified.

The operation of each component and the change of each signal at time t64 are same as the operation of each component and the change of each signal at time t61. Since the periodic signal S1 is maintained at a low level during the period from the time t64 to the time t65, the switch 520 is maintained in the ON state. Although the SPAD 510 could be charged by turning on the switch 520, the SPAD 510 has not performed the avalanche multiplication operation in the immediately preceding period P11. Therefore, the potential Pn is maintained to the potential at the time t64 in the period from the time t64 to the time t65. That is, the potential Pn is maintained at the logical threshold Th or more during the period from the time t64 to the time t65, and the inverted signal S3 is maintained at a low level. As a result, the detection signal S8 is maintained at a low level during the period from the time t64 to the time t65.

At time t65, the periodic signal S1 transitions from a low level to a high level, and the switch 520 turns from the ON state to the OFF state. Since the periodic signal S1 is maintained at a high level during the period from the time t65 to the time t66, the switch 520 is maintained in the OFF state. Therefore, the potential Pn is maintained to the potential at the time t65, and the inverted signal S3 is maintained at a low level. As a result, during the period from time t65 to time t66, the detection signal S8 is maintained at a low level.

At time t66, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. At time t66, the periodic signal S1 is at a high level. As a result, the detection signal S8 transitions from a low level to a high level at time t66. In response to the transition of the detection signal S8 to a high level, an increment process is executed in the counter 551. That is, the counter 551 updates the count value from n to n+1 at time t66. Since the periodic signal S1 is maintained at a high level during the period from the time t66 to the time t67, the switch 520 is maintained in the OFF state. Therefore, during the period from the time t66 to the time t67, the potential Pn is maintained to a potential lower than the logical threshold Th at the time t66, and the inverted signal S3 is maintained at a high level. Thus, the detection signal S8 is maintained at a high level during the period from the time t66 to the time t67.

At time t67, the period P12 ends, and at the same time, the period P13 starts. The operation of each component and the change of each signal during the period from time t67 to time t69 are same as the operation of each component and the change of each signal during the period from time t61 to time t63.

At time t69, the periodic signal S1 transitions from a low level to a high level, and the switch 520 turns from the ON state to the OFF state. When the switch 520 is turned to the OFF state, charging of the SPAD 510 is stopped. That is, the rise of the potential Pn stops.

Since the periodic signal S1 is maintained at a high level during the period from the time t69 to the time t70, the switch 520 is maintained in the OFF state. Therefore, the SPAD 510 is not charged during the period from the time t69 to the time t70, the potential Pn is maintained to the potential at the time t69, and the inverted signal S3 is maintained at a low level. As a result, the detection signal S8 is maintained at a low level during the period from the time t69 to the time t70.

At time t70, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. The periodic signal S1 is at a high level at time t70. Therefore, at time t70, the detection signal S8 transitions from a low level to a high level. In response to the transition of the detection signal S8 to a high level, an increment process is executed in the counter 551. That is, the counter 551 updates the count value from n+1 to n+2 at time t70. Since the periodic signal S1 is maintained at a high level during the period from the time t70 to the time t71, the switch 520 is maintained in the OFF state. Therefore, during the period from the time t70 to the time t71, the potential Pn is maintained to a potential lower than the logical threshold Th at the time t21, and the inverted signal S3 is maintained at a high level. As a result, during the period from time t70 to time t71, the detection signal S8 is maintained at a high level.

At time t71, the period P13 ends, and at the same time, period P14 starts. The operation of each component and the change of each signal during the period from time t71 to time t74 are same as the operation of each component and the change of each signal during the period from time t67 to time t70.

At time t74, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. The periodic signal S1 is at a high level at time t74. Therefore, at time t74, the detection signal S8 transitions from a low level to a high level. In response to the transition of the detection signal S8 to a high level, an increment process is executed in the counter 551. That is, the counter 551 updates the count value from n+2 to n+3 at time t74. The operation of each component and the change of each signal during the period from time t74 to time t75 are same as the operation of each component and the change of each signal during the period from time t70 to time t71.

At time t75, the period P14 ends, and at the same time, the period P15 starts. The operation of each component and the change of each signal during the period from time t75 to time t78 are same as the operation of each component and the change of each signal during the period from time t67 to time t70.

At time t78, a photon enters the SPAD 510. The incidence of photon causes avalanche multiplication in the SPAD 510. In response to the avalanche multiplication operation of the SPAD 510, the potential Pn becomes lower than the logical threshold Th, and the inverted signal S3 transitions from a low level to a high level. The periodic signal S1 is at a high level at time t78. Therefore, at time t78, the detection signal S8 transitions from a low level to a high level. In response to the transition of the detection signal S8 to a high level, an increment process is executed in the counter 551. That is, the counter 551 updates the count value from n+3 to n+4 at time t78. Since the periodic signal S1 is maintained at a high level during the period from the time t78 to the time t79, the switch 520 is maintained in the OFF state. Therefore, during the period from the time t78 to the time t79, the potential Pn is maintained to a potential lower than the logical threshold Th at the time t78, and the inverted signal S3 is maintained at a high level. As a result, during the period from time t78 to time t79, the detection signal S8 is maintained at a high level. During the period from time t78 to time t79, a photon enters the SPAD 510. However, the SPAD 510 has already performed the avalanche multiplication operation by the incidence of the photon at the time t78, and the SPAD 510 is not charged during the period from the time t78 to the time t79. Therefore, the potential Pn, the inverted signal S3, and the detection signal S8 are not affected by the incidence of the photon during the period from the time t78 to the time t79.

At time t79, the period P15 ends, and at the same time, the period P16 starts. The operation of each component and the change of each signal at time t79 are same as the operation of each component and the change of each signal at time t61. Since the periodic signal S1 is maintained at a low level during the period from the time t79 to the time t80, the switch 520 is maintained in the ON state. Therefore, although the SPAD 510 is charged during the period from the time t79 to the time t80, the potential Pn does not exceed the logical threshold Th during the period from the time t79 to the time t80. As a result, the inverted signal S3 is maintained at a high level during the period from time t79 to time t80. On the other hand, since the periodic signal S1 is at a low level during the period from the time t79 to the time t80, the detection signal S8 is maintained at a low level.

At time t80, a photon enters the SPAD 510. The incidence of photon causes avalanche multiplication in the SPAD 510. The potential Pn decreases due to the avalanche multiplication operation of the SPAD 510. The SPAD 510 is charged again during the period from the time t80 to the time t81, but the potential Pn is maintained below the logical threshold Th during the period from the time t80 to the time t81. Therefore, the inverted signal S3 is maintained at a high level during the period from the time t80 to the time t81.

On the other hand, since the periodic signal S1 is at a low level during the period from the time t80 to the time t81, the detection signal S8 is at a low level during the period from the time t80 to the time t81. Therefore, the increment process by the counter 551 is not executed during the period from the time t80 to the time t81. That is, during the period from time t80 to time t81, the count value held by the counter 551 is maintained at n+4. During the period from time t80 to time t81, a photon further enters the SPAD 510, and avalanche multiplication occurs in the SPAD 510. Even in this case, as in the case where a single photon enters the SPAD 510 during the period from the time t79 to the time t81, the potential Pn is lower than the logical threshold Th during the period from the time t79 to the time t81. Therefore, the counter 551 operates independently of the number of photons entering the SPAD 510 during the period from the time t79 to the time t81.

At time t81, the periodic signal S1 transitions from a low level to a high level, and the switch 520 turns from the ON state to the OFF state. At time t81, the inverted signal S3 is at a high level. As a result, the detection signal S8 transitions from a low level to a high level at time t81. In response to the transition of the detection signal S8 to a high level, an increment process is executed in the counter 551. That is, the counter 551 updates the count value from n+4 to n+5 at time t81. Since the periodic signal S1 is maintained at a high level during the period from the time t81 to the time t82, the switch 520 is maintained in the OFF state. Therefore, the first potential Pn is maintained to a potential lower than the logical threshold Th at the time t81, and the inverted signal S3 is maintained at a high level. Thus, the detection signal S8 is maintained at a high level during the period from the time t81 to the time t82.

At time t82, a photon enters the SPAD 510. The incidence of photon causes avalanche multiplication in the SPAD 510. In response to the avalanche multiplication operation of the SPAD 510, the potential Pn decreases and is maintained to a potential lower than the logical threshold Th. Therefore, the inverted signal S3 and the detection signal S8 are maintained at a high level at time t82. The operation of each component and the change of each signal during the period from time t82 to time t83 are same as the operation of each component and the change of each signal during the period from time t78 to time t79. During the period from time t82 to time t83, a photon enters the SPAD 510. However, the SPAD 510 has already performed the avalanche multiplication operation by the incidence of the photon at the time t82, and the SPAD 510 is not charged during the period from the time t82 to the time t83. Therefore, the potential Pn, the inverted signal S3, and the detection signal S8 are not affected by the incidence of photons during the period from time t82 to time t83. At time t83, the period P16 ends.

As shown in FIG. 9, the circuit 530 according to the present embodiment generates the detection signal S8 based on a change in voltage of the SPAD 510 over one period of the periodic signal S1 and the periodic signal S1 input to the circuit 530. That is, the circuit 530 generates the detection signal S8 based on the change in voltage of the SPAD 510 during the period in which the switch 520 is in the ON state and the OFF state. When light (photon) enters the SPAD 510, the detection signal S8 transitions from a low level to a high level within a period in which the periodic signal S1 is at a high level. The counter 551 increments the count value C1 at the time when the detection signal S8 transitions from a low level to a high level. Thus, the counter 551 increments the count value C1 based on the photons entering the SPAD 510 at the time t66 of the period P12, the time t70 of the period P13, the time t74 of the period P14, the time t78 of the period P15, and the time t80 of the period P16. Therefore, the photon detection period Pd1 based on the detection signal S8 from the circuit 530 corresponds to the entire period of one period of the periodic signal S1 (the hatched portion of Pd1 shown in FIG. 9).

The pixel unit 50 according to the present embodiment outputs the count value C1 without receiving the periodic signal Sg1. That is, the photoelectric conversion device 100 according to the present embodiment can output two count values C1 and C2 that are based on different sensitivities to photons without using the delay unit 91 of the first embodiment. Therefore, according to the present embodiment, it is not necessary to provide the delay unit 91 and the wiring for supplying the periodic signal S2 to the delay unit 91 in the outside of each pixel unit 50. Therefore, the present embodiment allows to further simplify the circuit configuration of the photoelectric conversion device, to further reduce the size of the photoelectric conversion device, and to realize further suppression of power consumption.

Fourth Embodiment

The configuration of the photoelectric conversion device according to the present embodiment will be described with reference to FIGS. 10 to 13. The photoelectric conversion device includes SPAD pixels including an avalanche photodiode (hereinafter referred to as "APD"). Of a pair of the charges generated in the APD, the conductivity type of the charge used as the signal charge is referred to as a first conductivity type. The first conductivity type refers to a conductivity type in which a charge having the same polarity as the signal charge is used as a majority carrier. Further, a conductivity type opposite to the first conductivity type is referred to as a second conductivity type. Although an example in which the signal charges are electrons, the first conductivity type is the N-type, and the second conductivity type is the P-type will be described below, the signal charges may be holes, the first conductivity type may be the P-type, and the second conductivity type may be the N-type.

Figure 10:
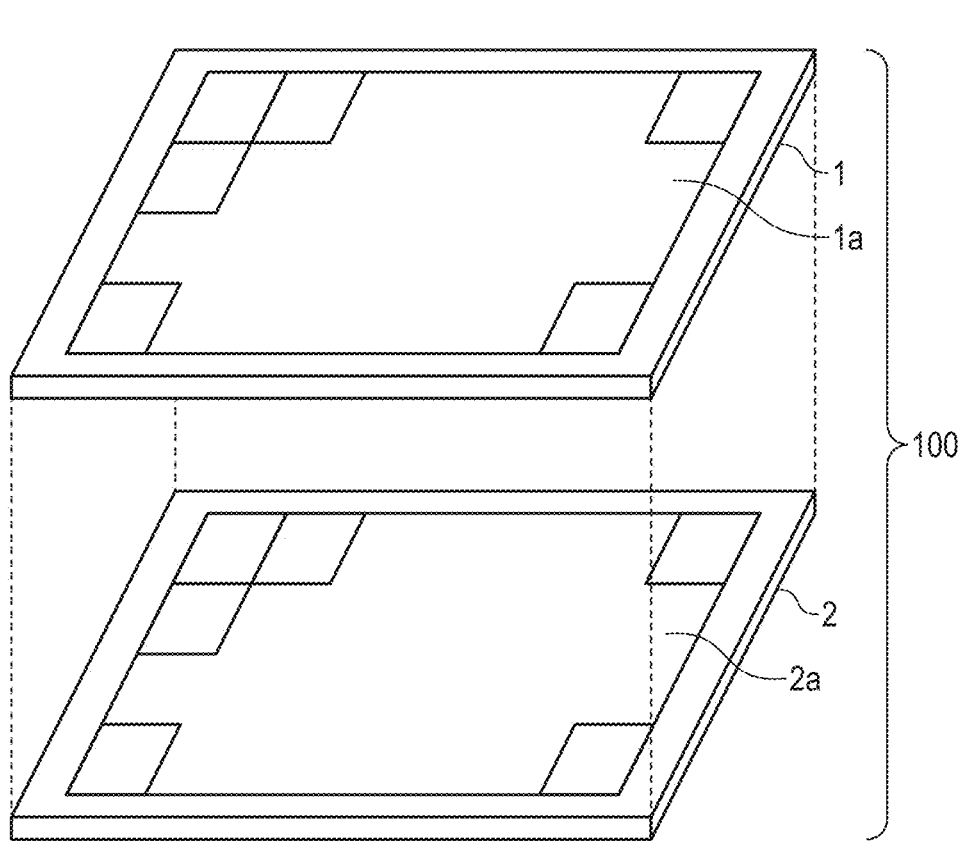
FIG. 10 illustrates a schematic diagram of the photoelectric conversion device according to the fourth embodiment.

FIG. 10 is a schematic diagram of a photoelectric conversion device according to the present embodiment, and shows a configuration of a stacked photoelectric conversion device 100. The photoelectric conversion device 100 includes a sensor substrate (first substrate) 1 and a circuit substrate (second substrate) 2 stacked on each other, and the sensor substrate 1 and the circuit substrate 2 are electrically connected to each other. The photoelectric conversion device according to the present embodiment is a back-illuminated photoelectric conversion device in which light is incident from a first surface of the sensor substrate 1 and the circuit substrate 2 is arranged on a second surface of the sensor substrate 1. The sensor substrate 1 includes a first semiconductor layer having photoelectric conversion elements described later and a first wiring structure. The circuit substrate 2 includes a second semiconductor layer having a circuit such as a signal processing unit described later and a second wiring structure. The photoelectric conversion device 100 is formed by stacking the second semiconductor layer, the second wiring structure, the first wiring structure, and the first semiconductor layer in this order.

Hereinafter, the sensor substrate 1 and the circuit substrate 2 may be diced chips, but are not limited to chips. For example, each of the substrates may be a wafer. Further, each substrate may be diced after being laminated in a wafer state, or chips may be stacked and bonded after being formed into chips. The sensor substrate 1 is provided with a pixel region 1a, and the circuit substrate 2 is provided with a circuit region 2a for processing a signal detected by the pixel region 1a.

Figure 11:
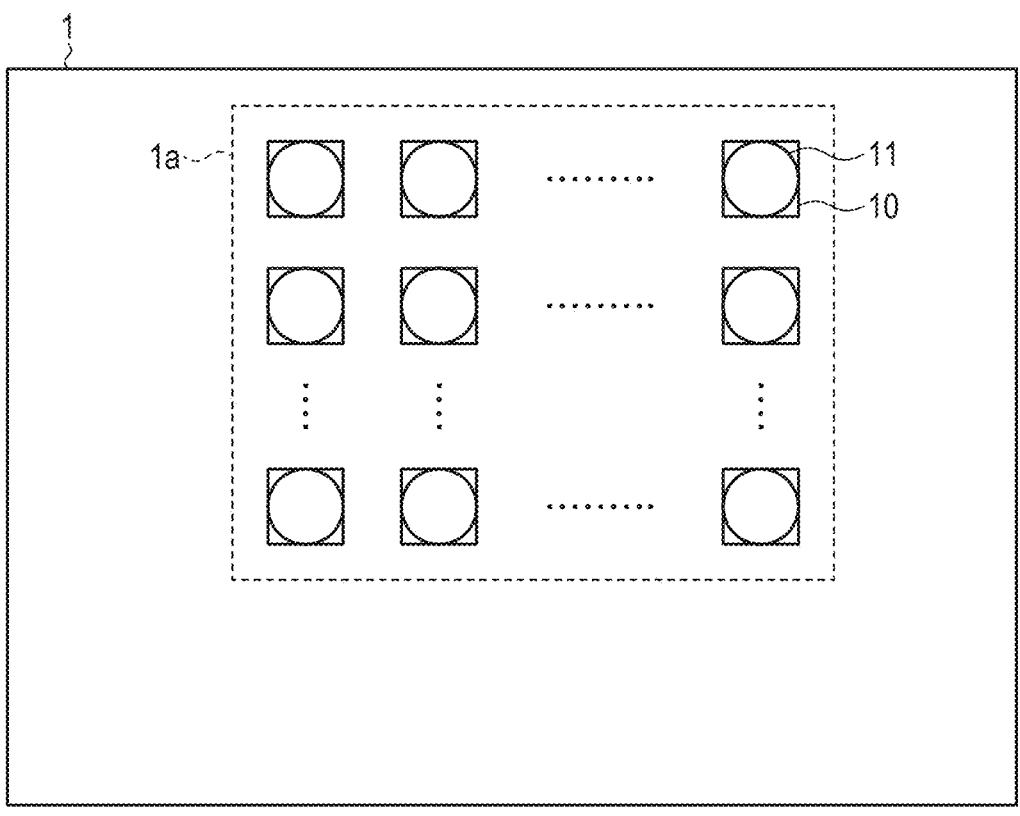
FIG. 11 illustrates a diagram showing an arrangement example of the sensor substrate according to the fourth embodiment.

FIG. 11 is a diagram illustrating an arrangement example of the sensor substrate 1. The plurality of pixels 10 each include an APD 11, and are arranged in a two-dimensional array in a plan view to form a pixel region 1a.

The pixel 10 is typically a pixel for forming an image, but when it is used in a TOF (Time of Flight), the pixel 10 does not necessarily need to form an image. That is, the pixel 10 may be a pixel for measuring the time at which light reaches and the amount of light.

Figure 12:
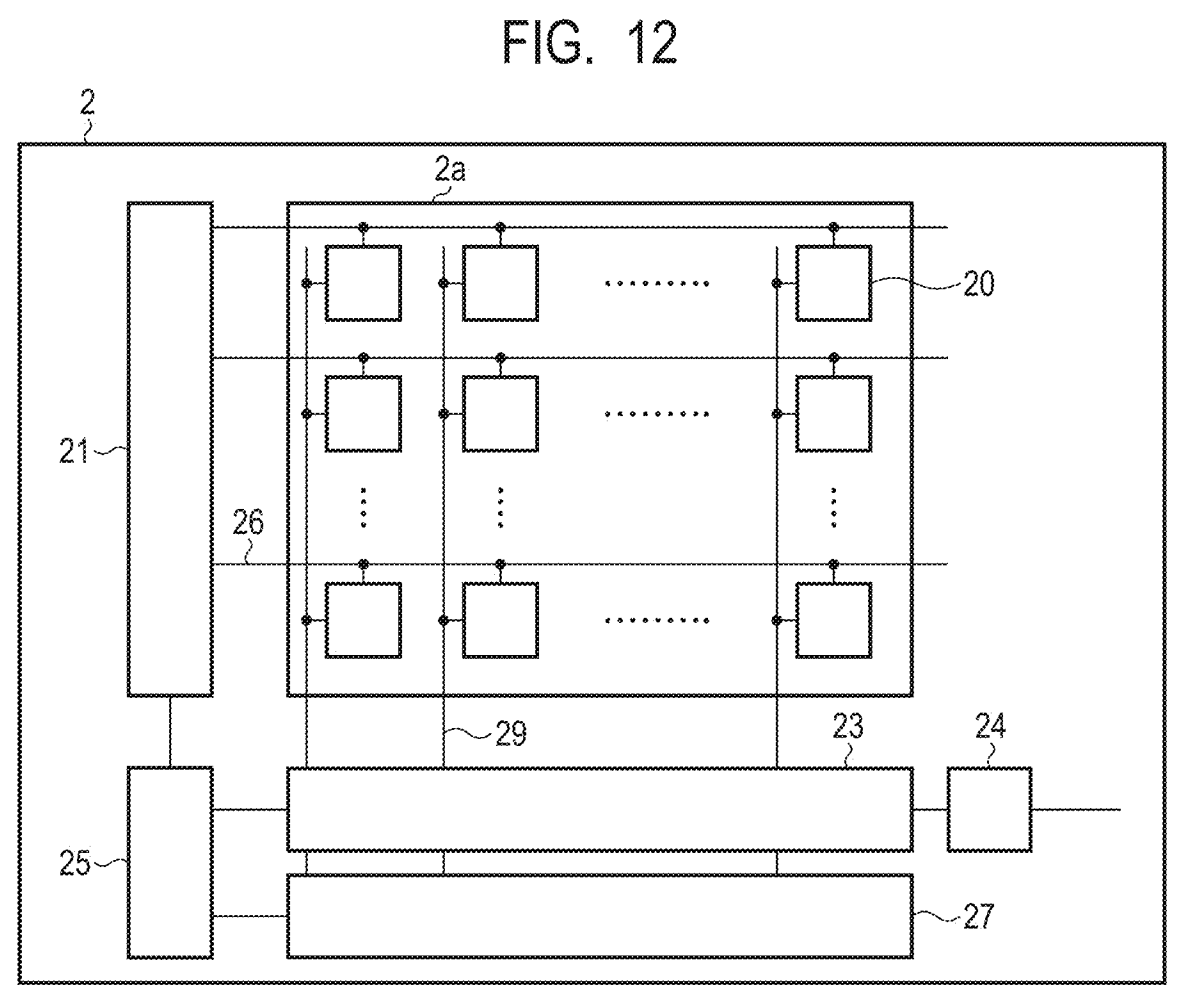

FIG. 12 is a diagram illustrating an arrangement example of the circuit substrate 2. The circuit substrate 2 includes a signal processing unit 20, a vertical scanning circuit 21, a readout circuit 23, a horizontal scanning circuit 27, an output calculation unit 24, a control pulse generation circuit 25, a scanning line 26, and a signal line 29. The circuit region 2a is arranged in a region overlapping the pixel region 1a in FIG. 11 in a plan view. Further, in the plan view in FIG. 11, the vertical scanning circuit 21, the readout circuit 23, the horizontal scanning circuit 27, the output calculation unit 24, and the control pulse generation circuit 25 are disposed to overlap with a region between the edge of the sensor substrate 1 and the edge of the pixel region 1a. That is, the sensor substrate 1 has a pixel region 1a and a non-pixel region arranged around the pixel region 1a, and the vertical scanning circuit 21, the readout circuit 23, the horizontal scanning circuit 27, the output calculation unit 24, and the control pulse generation circuit 25 are arranged in a region overlapping the non-pixel region in a plan view.

The signal processing units 20 are electrically connected to the pixels 10 through connection wirings each provided for the pixel 10, and are arranged in a two-dimensional array in a plan view, similarly to the pixels 10. The signal processing unit 20 includes a binary counter that counts photons incident on the pixel 10.

The vertical scanning circuit 21 receives a control pulse supplied from the control pulse generation circuit 25, and supplies the control pulse to the signal processing unit 20 corresponding to the pixels 10 in each row via the scanning line 26. The vertical scanning circuit 21 may include a logic circuit such as a shift register or an address decoder.

The readout circuit 23 acquires a pulse count value of a digital signal from the signal processing unit 20 of each row via the signal line 29. Then, an output signal is output to a signal processing circuit (signal processing device) outside the photoelectric conversion device 100 via the output calculation unit 24. The readout circuit 23 may have a function of a signal processing circuit for correcting the pulse count value or the like. The horizontal scanning circuit 27 receives the control pulse from the control pulse generation circuit 25, and sequentially outputs the pulse count value of each column in the readout circuit 23 to the output calculation unit 24. As described later, when the pulse count value exceeds a threshold value, the output calculation unit 24 estimates an actual image signal (pulse count value) based on the time count value included in additional information and the threshold value, and replaces (extrapolates) the pulse count value with the estimated pulse count value. On the other hand, when the pulse count value is equal to or smaller than the threshold value, the pulse count value is output as an image signal as it is.

The output calculation unit 24 performs a predetermined process on the pulse count value read by the readout circuit 23, and outputs an image signal to the outside. As will be described later, when the pulse count value exceeds the threshold value, the output calculation unit 24 can perform processing such as calculation of the pulse count value.

In FIG. 11, the arrangement of photoelectric conversion elements in the pixel region 1a may be one-dimensionally arranged. In addition, the effect of the present disclosure can be achieved even in a configuration in which a single pixel 10 is provided, and a configuration in which a single pixel 10 is provided can be included in the present disclosure. In the photoelectric conversion device having a plurality of pixels 10, the effect of suppressing the circuit scale according to the present embodiment becomes more significant. It is not necessary to provide one signal processing unit 20 for every pixel 10. For example, one signal processing unit 20 may be shared by a plurality of pixels 10 and signal processing may be sequentially performed.

Figure 13:
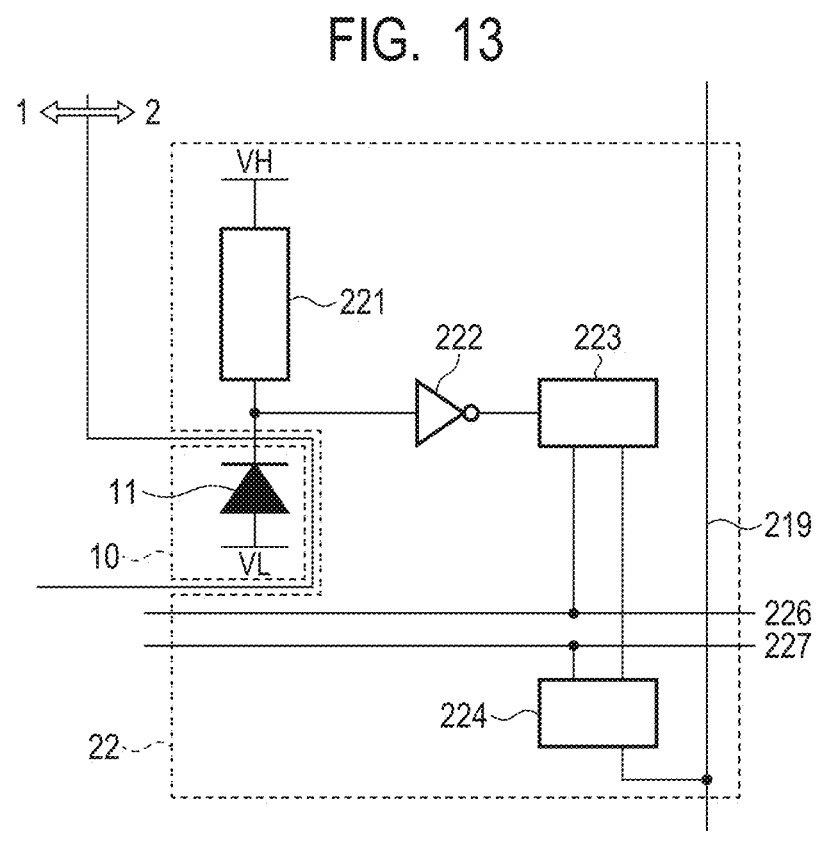

FIG. 13 is a block diagram of the APD and a pulse generation unit according to the present embodiment. FIG. 13 illustrates the pixels 10 of the sensor substrate 1 and a pulse generation unit 22 in the signal processing unit 20 of the circuit substrate 2. The APD 11 is disposed in the pixel 10. The pulse generation unit 22 includes a quenching element 221, a waveform shaping unit 222, a counter circuit 223, and a selection circuit 224.

The APD 11 generates charge pairs corresponding to incident light by photoelectric conversion. A voltage VL (first voltage) is supplied to an anode of the APD 11. A voltage VH (second voltage) higher than the voltage VL supplied to the anode is supplied to a cathode of the APD 11. A reverse bias voltage is applied to the anode and the cathode, and the APD 11 is in a state capable of avalanche multiplication. When photons enter the APD 11 in a state where the reverse bias voltage is supplied, charges generated by the photons cause avalanche multiplication, and an avalanche current is generated.

The APD 11 can operate in the Geiger mode or the linear mode according to the voltage of the reverse bias. The Geiger mode is an operation in a state where the potential difference between the anode and the cathode is higher than the breakdown voltage, and the linear mode is an operation in a state where the potential difference between the anode and the cathode is near or lower than a breakdown voltage. An APD operating in the Geiger mode is particularly referred to as SPAD or SPAD-type. As an example, the voltage VL (first voltage) may be −30 V and the voltage VH (second voltage) may be 1 V. The APD 11 may operate in a linear mode or a Geiger mode. When the APD 11 operates as the SPAD, the potential difference becomes larger than that of the APD 11 in the linear mode, and the effect of the withstand voltage becomes significant. Accordingly, the SPAD is preferable in this case.

The quenching element 221 is provided between the power supply line for supplying the voltage VH and the cathode of the APD 11. The quenching element 221 functions as a load circuit (quenching circuit) at the time of signal multiplication by avalanche multiplication, and has a function of suppressing a voltage supplied to the APD 11 and suppressing avalanche multiplication (quenching operation). Further, the quenching element 221 has a function of returning the voltage supplied to the APD 11 to the voltage VH by flowing a current corresponding to the voltage drop in the quenching operation (recharging operation).

The waveform shaping unit 222 functions as a signal generation unit that generates a detection pulse based on an output generated by incidence of a photon. That is, the waveform shaping unit 222 shapes the potential change of the cathode of the APD 11 obtained at the time of photon detection, and outputs a rectangular wave pulse signal (detection pulse). As the waveform shaping unit 222, for example, an inverter circuit is used. Although FIG. 13 shows an example in which one inverter is used as the waveform shaping unit 222, a circuit having a plurality of inverters are connected in series may be used. Other circuits having a waveform shaping effect may also be used.

The counter circuit 223 counts the pulse signals output from the waveform shaping unit 222 and holds the count value. Further, a control pulse is supplied from the vertical scanning circuit 21 shown in FIG. 12 to the counter circuit 223 through a driving line 226 included in the scanning line 26. When the control pulse becomes active, the signal held in the counter circuit 223 is reset.

The selection circuit 224 includes a switch circuit, a buffer circuit for outputting a signal, and the like. The selection circuit 224 is supplied with a control pulse from the vertical scanning circuit 21 shown in FIG. 12 through a driving line 227. In accordance with the control pulse, the selection circuit 224 electrically switches a connected state or a non-connected state between the counter circuit 223 and a signal line 219.

A switch such as a transistor may be provided between the quenching element 221 and the APD 11, and between the APD 11 and the signal processing unit 20. Alternatively, the supply of the voltage VH or the voltage VL may be electrically switched by a switch such as a transistor.

FIGS. 14A, 14B, and 14C are diagrams illustrating the relationship between the operation of the APD and the output signal in the present embodiment. FIG. 14A is a diagram extracted from the APD 11, the quenching element 221, and the waveform shaping unit 222 in FIG. 13. When the input side and the output side of the waveform shaping unit 222 are node A and node B, FIG. 14B illustrates a waveform change of node A and FIG. 14C illustrates a waveform change of node B.

In a period from time t0 to time t1, a reverse bias voltage of VH-VL is applied to the APD 11. When a photon is incident on the APD 11 at the time t1, avalanche multiplication occurs in the APD 11, an avalanche multiplication current flows in the quenching element 221, and the voltage of node A drops. When the voltage drop further increases and the potential difference applied to the APD 11 decreases, the avalanche multiplication of the APD 11 stops at time t3, and the voltage level of the node A does not drop by a certain constant value or more. After that, in a period from time t3 to time t5, a current that compensates a voltage drop from the voltage VL flows through the node A, and at the time t5, the node A is settled to the original voltage level. In this case, from time t2 to time t4, when the voltage level of the node A is lower than the threshold value of the waveform shaping unit 222, the node B becomes high level. That is, the voltage waveform of node A is shaped by the waveform shaping unit 222, and a rectangular wave pulse signal is output from node B.

Fifth Embodiment

Figure 15:
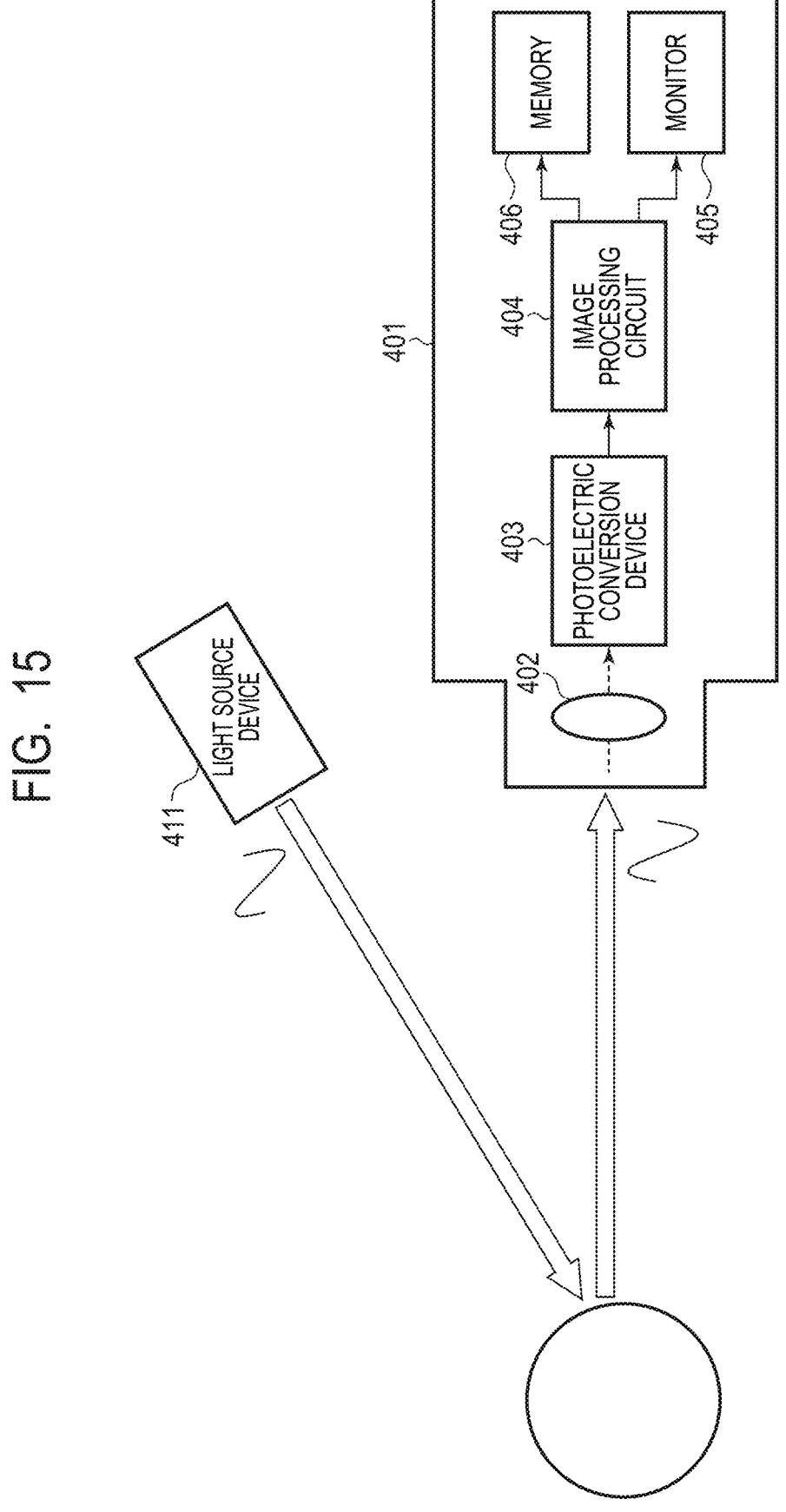
FIG. 15 illustrates a block diagram of the light detection system according to the fifth embodiment.

FIG. 15 is a block diagram of a photodetection system according to the present embodiment. More specifically, FIG. 15 is a block diagram of a ranging image sensor using the photoelectric conversion device according to the present embodiments.

As illustrated in FIG. 15, a ranging image sensor 401 includes an optical system 402, a photoelectric conversion device 403, an image processing circuit 404, a monitor 405, and a memory 406. The ranging image sensor 401 receives light (modulated light, pulsed light) emitted from a light source device 411 toward an object and reflected by the surface of the object. The ranging image sensor 401 can acquire a distance image corresponding to the distance to the object based on the time from light emission to light reception.

The optical system 402 includes one or a plurality of lenses, guides image light (incident light) from the object to the photoelectric conversion device 403, and forms an image on a light receiving surface (sensor portion) of the photoelectric conversion device 403.

As the photoelectric conversion device 403, the photoelectric conversion device of each of the above embodiments can be applied. The photoelectric conversion device 403 supplies a distance signal indicating a distance obtained from the received light signal to the image processing circuit 404.

The image processing circuit 404 performs image processing for forming a distance image based on the distance signal supplied from the photoelectric conversion device 403. The distance image (image data) obtained by image processing can be displayed on the monitor 405 and stored (recorded) in the memory 406.

By applying the photoelectric conversion device described above to the ranging image sensor 401 configured as described above, a more accurate distance image can be acquired.

Sixth Embodiment

The technology according to the present disclosure can be applied to various products. For example, techniques according to the present disclosure may be applied to endoscope surgery systems which is an example of the photodetection system.

Figure 16:
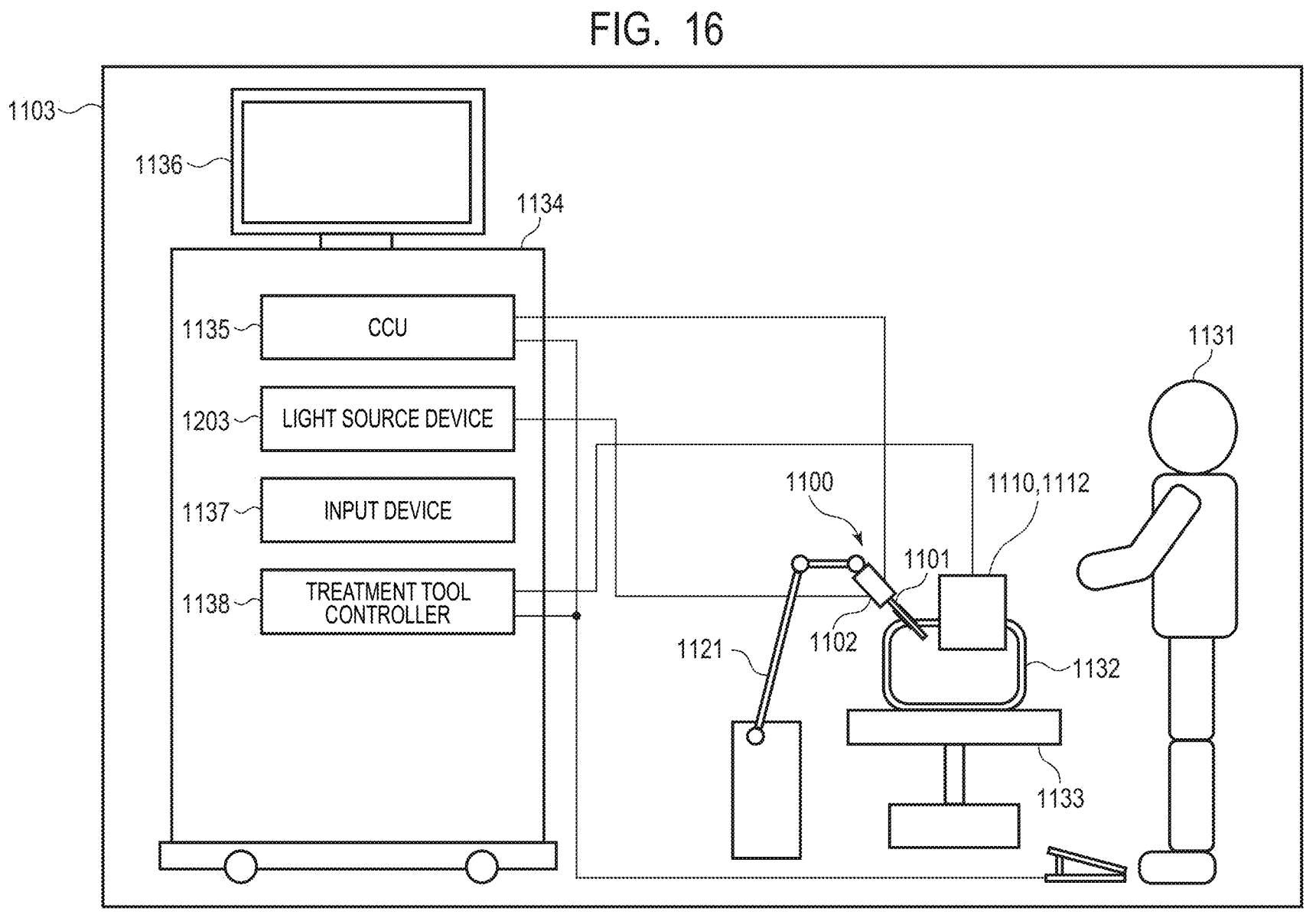

FIG. 16 is a schematic view of an endoscope surgery system according to the present embodiment. FIG. 16 shows a state in which an operator (physician) 1131 performs surgery on a patient 1132 on a patient bed 1133 using an endoscope surgery system 1103. As shown, the endoscope surgery system 1103 includes an endoscope 1100, a surgery tool 1110, and a cart 1134 on which various devices for endoscopic surgery are mounted.

The endoscope 1100 includes a lens barrel 1101 in which an area of a predetermined length from the distal end is inserted into the body cavity of the patient 1132, a camera head 1102 connected to the proximal end of the lens barrel 1101, and an arm 1121. Although FIG. 16 illustrates the endoscope 1100 configured as a so-called rigid scope having the rigid lens barrel 1101, the endoscope 1100 may be configured as a so-called flexible scope having a flexible lens barrel.

An opening into which an objective lens is fitted is provided at a distal end of the lens barrel 1101. A light source device 1203 is connected to the endoscope 1100. Light generated by the light source device 1203 is guided to the distal end of the barrel by a light guide extended inside the lens barrel 1101, and is irradiated toward an observation target in the body cavity of the patient 1132 via an objective lens. The endoscope 1100 may be a straight-viewing scope an oblique-viewing scope, or a side-viewing scope.

An optical system and a photoelectric conversion device are provided inside the camera head 1102, and reflected light (observation light) from an observation target is focused on the photoelectric conversion device by the optical system. The observation light is photoelectrically converted by the photoelectric conversion device, and an electric signal corresponding to the observation light, that is, an image signal corresponding to the observation image is generated. As the photoelectric conversion device, the photoelectric conversion device described in each of the above embodiments can be used. The image signal is transmitted to a camera control unit (CCU) 1135 as RAW data.

The CCU 1135 includes a central processing unit (CPU), a graphics processing unit (GPU), and the like, and controls overall operations of the endoscope 1100 and a display device 1136. Further, the CCU 1135 receives an image signal from the camera head 1102, and performs various kinds of image processing for displaying an image based on the image signal, such as development processing (demosaic processing).

The display device 1136 displays an image based on the image signal subjected to the image processing by the CCU 1135 under the control of the CCU 1135.

The light source device 1203 includes, for example, a light source such as a light emitting diode (LED), and supplies irradiation light to the endoscope 1100 when capturing an image of an operating part or the like.

An input device 1137 is an input interface to the endoscope surgery system 1103. The user can input various types of information and input instructions to the endoscope surgery system 1103 via the input device 1137.

A treatment tool controller 1138 controls the actuation of an energy treatment tool 1112 for ablation of tissue, incision, sealing of blood vessels, etc.

The light source device 1203 is capable of supplying irradiation light to the endoscope 1100 when capturing an image of the surgical site, and may be, for example, a white light source formed by an LED, a laser light source, or a combination thereof. When a white light source is configured by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the image pickup device of the camera head 1102 may be controlled in synchronization with the irradiation timing. Thus, images corresponding to R, G, and B can be captured in a time-division manner. According to this method, a color image can be obtained without providing a color filter in the image pickup device.

The driving of the light source device 1203 may be controlled such that the intensity of light output from the light source device 1203 is changed at predetermined time intervals. By controlling the driving of the image pickup device of the camera head 1102 in synchronization with the timing of changing the intensity of light to acquire an image in a time-division manner, and by synthesizing the images, it is possible to generate an image in a high dynamic range without so-called blackout and whiteout.

Further, the light source device 1203 may be configured to be able to supply light in a predetermined wavelength band corresponding to special light observation. In special light observation, for example, the wavelength dependence of light absorption in body tissue can be used. Specifically, a predetermined tissue such as a blood vessel in the surface layer of the mucosa is imaged with high contrast by irradiating light in a narrow band compared to the irradiation light (i.e., white light) during normal observation. Alternatively, in special light observation, fluorescence observation for obtaining an image by fluorescence generated by irradiation with excitation light may be performed. In the fluorescence observation, excitation light can be irradiated to the body tissue to observe fluorescence from the body tissue, or a reagent such as indocyanine green (ICG) can be locally injected into the body tissue and the body tissue can be irradiated with excitation light corresponding to the fluorescence wavelength of the reagent to obtain a fluorescence image. The light source device 1203 may be configured to be able to supply narrowband light and/or excitation light corresponding to such special light observation.

Seventh Embodiment

A light detection system and A movable body of the present embodiment will be described with reference to FIGS. 17A, 17B, 17C, 17D and 18. In the present embodiment, an example of an in-vehicle camera is illustrated as a light detection system.

Figure 17A:
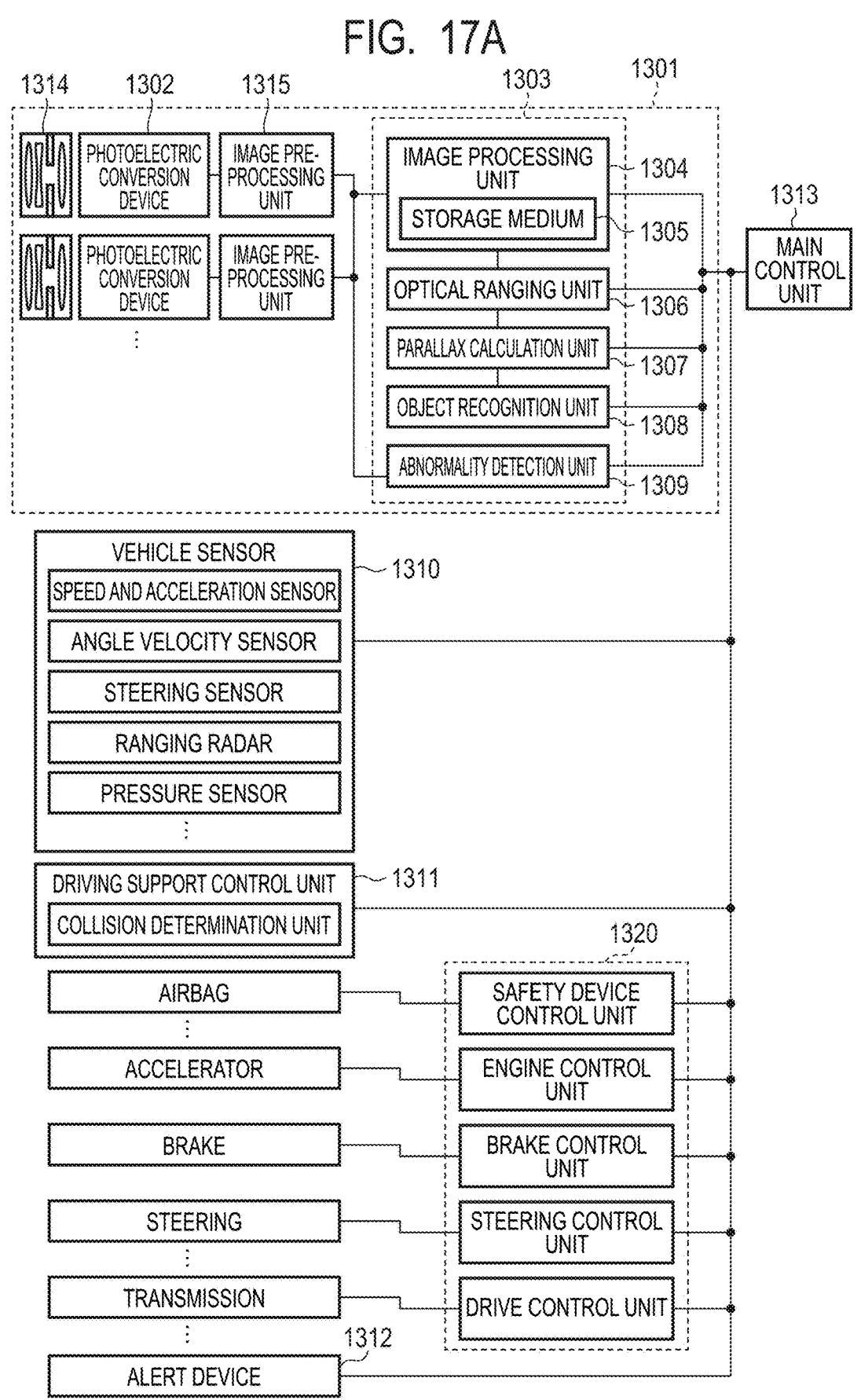
FIG. 17A illustrates a schematic diagram of the light detection system according to the seventh embodiment.

FIG. 17A is a schematic diagram of a light detection system according to the present embodiment. More specifically, FIG. 17A illustrates an example of a vehicle system and a light detection system mounted on the vehicle system. A light detection system 1301 includes photoelectric conversion devices 1302, image pre-processing units 1315, an integrated circuit 1303, and optical systems 1314. The optical system 1314 forms an optical image of an object on the photoelectric conversion device 1302. The photoelectric conversion device 1302 converts the optical image of the object formed by the optical system 1314 into an electric signal. The photoelectric conversion device 1302 is the photoelectric conversion device of any one of the above-described embodiments. The image pre-processing unit 1315 performs predetermined signal processing on the signal output from the photoelectric conversion device 1302. The function of the image pre-processing unit 1315 may be incorporated in the photoelectric conversion device 1302. The light detection system 1301 is provided with at least two sets of the optical system 1314, the photoelectric conversion device 1302, and the image pre-processing unit 1315, and an output signal from the image pre-processing units 1315 of each set is input to the integrated circuit 1303.

The integrated circuit 1303 is an integrated circuit for use in an imaging system. The integrated circuit 1303 includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 performs primary storage of captured images and stores defect positions of image capturing pixels. The optical ranging unit 1306 focuses or measures the object. The parallax calculation unit 1307 calculates distance measurement information from the plurality of image data acquired by the plurality of photoelectric conversion devices 1302. The object recognition unit 1308 recognizes an object such as a car, a road, a sign, or a person. When the abnormality detection unit 1309 detects the abnormality of the photoelectric conversion device 1302, the abnormality detection unit 1309 issues an abnormality to a main control unit 1313.

The integrated circuit 1303 may be realized by dedicated hardware, a software module, or a combination thereof. It may be realized by a field programmable gate array (FPGA), an application specific integrated circuit (ASIC), or the like, or may be realized by a combination of these.

The main control unit 1313 (movable body controller) controls overall operations of the light detection system 1301, a vehicle sensor 1310, a control unit 1320, and the like. Without the main control unit 1313, the light detection system 1301, the vehicle sensor 1310, and the control unit 1320 may individually have a communication interface, and each of them may transmit and receive control signals via a communication network, for example, according to the CAN standard.

The integrated circuit 1303 has a function of transmitting a control signal or a setting value to the photoelectric conversion device 1302 by receiving a control signal from the main control unit 1313 or by its own control unit.

The light detection system 1301 is connected to the vehicle sensor 1310, and can detect a traveling state of the host vehicle such as a vehicle speed, a yaw rate, a steering angle, and the like, an environment outside the host vehicle, and states of other vehicles and obstacles. The vehicle sensor 1310 is also a distance information acquisition unit that acquires distance information to the object.

The light detection system 1301 is connected to a driving support control unit 1311 that performs various driving support functions such as an automatic steering function, an automatic cruise function, and a collision prevention function. Particularly, regarding the collision determination function, based on detection results of the light detection system 1301 and the vehicle sensor 1310, it is determined whether or not there is a possibility or occurrence of collision with another vehicle or an obstacle. Thus, avoidance control is performed when a possibility of collision is estimated and a safety device is activated when collision occurs.

The light detection system 1301 is also connected to an alert device 1312 that issues an alarm to a driver based on a determination result of the collision determination unit. For example, when the possibility of collision is high as the determination result of the collision determination unit, the main control unit 1313 performs vehicle control such as braking, returning an accelerator, suppressing engine output, or the like, thereby avoiding collision or reducing damage. The alert device 1312 issues a warning to a user using means such as an alarm of a sound or the like, a display of alarm information on a display unit screen such as a car navigation system and a meter panel, and a vibration application to a seatbelt and a steering wheel.

Figure 17B:
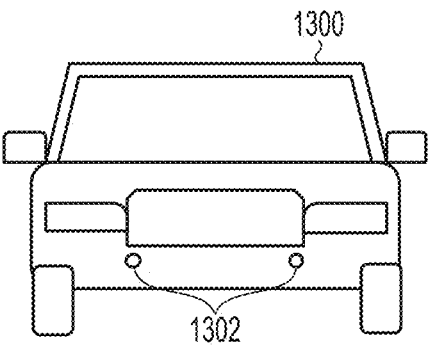
FIG. 17B illustrates a schematic diagram of the movable body according to the seventh embodiment.
Figure 17C:
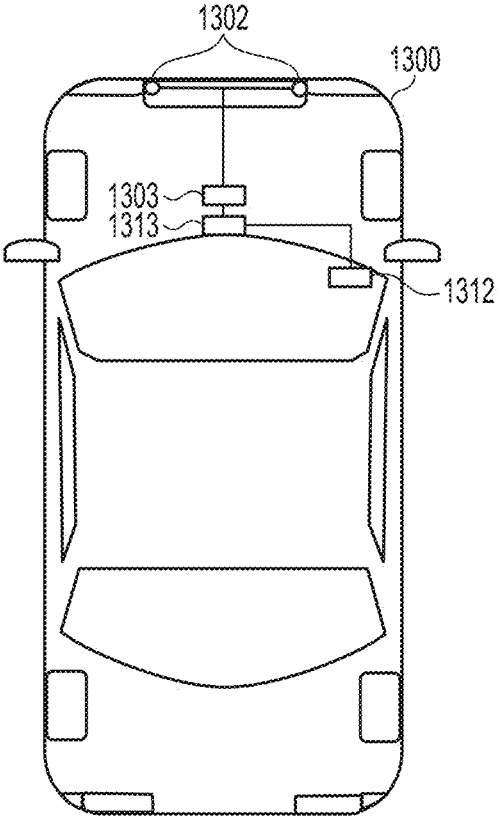
FIG. 17C illustrates a schematic diagram of the movable body according to the seventh embodiment.
Figure 17D:
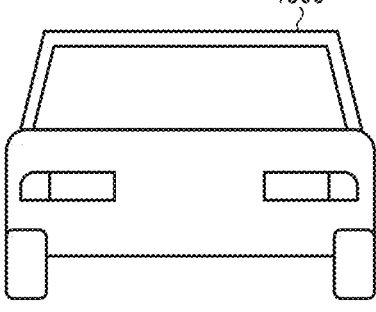
FIG. 17D illustrates a schematic diagram of the movable body according to the seventh embodiment.

The light detection system 1301 according to the present embodiment can capture an image around the vehicle, for example, the front or the rear. FIGS. 17B, 17C, and 17D are schematic diagrams of a movable body according to the present embodiment, and illustrate a configuration in which an image of the front of the vehicle is captured by the light detection system 1301.

The two photoelectric conversion devices 1302 are arranged in front of a vehicle 1300. Specifically, it is preferable that a center line with respect to a forward/backward direction or an outer shape (for example, a vehicle width) of the vehicle 1300 be regarded as a symmetry axis, and the two photoelectric conversion devices 1302 be arranged in line symmetry with respect to the symmetry axis. This makes it possible to effectively acquire distance information between the vehicle 1300 and the object to be imaged and determine the possibility of collision. Further, it is preferable that the photoelectric conversion device 1302 be arranged at a position where it does not obstruct the field of view of the driver when the driver sees a situation outside the vehicle 1300 from the driver's seat. The alert device 1312 is preferably arranged at a position that is easy to enter the field of view of the driver.

Next, a failure detection operation of the photoelectric conversion device 1302 in the light detection system 1301 will be described with reference to FIG. 18. FIG. 18 is a flowchart illustrating an operation of the light detection system according to the present embodiment. The failure detection operation of the photoelectric conversion device 1302 may be performed according to steps S1410 to S1480 illustrated in FIG. 18.

In step S1410, the setting at the time of startup of the photoelectric conversion device 1302 is performed. That is, setting information for the operation of the photoelectric conversion device 1302 is transmitted from the outside of the light detection system 1301 (for example, the main control unit 1313) or the inside of the light detection system 1301, and the photoelectric conversion device 1302 starts an imaging operation and a failure detection operation.

Next, in step S1420, the photoelectric conversion device 1302 acquires pixel signals from the effective pixels. In step S1430, the photoelectric conversion device 1302 acquires an output value from a failure detection pixel provided for failure detection. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Steps S1420 and S1430 may be executed in reverse order.

Next, in step S1440, the light detection system 1301 performs a determination of correspondence between the expected output value of the failure detection pixel and the actual output value from the failure detection pixel. If it is determined in step S1440 that the expected output value matches the actual output value, the light detection system 1301 proceeds with the process to step S1450, determines that the imaging operation is normally performed, and proceeds with the process to step S1460. In step S1460, the light detection system 1301 transmits the pixel signals of the scanning row to the storage medium 1305 and temporarily stores them.

Thereafter, the process of the light detection system 1301 returns to step S1420 to continue the failure detection operation. On the other hand, as a result of the determination in step S1440, if the expected output value does not match the actual output value, the light detection system 1301 proceeds with the process to step S1470. In step S1470, the light detection system 1301 determines that there is an abnormality in the imaging operation, and issues an alert to the main control unit 1313 or the alert device 1312. The alert device 1312 causes the display unit to display that an abnormality has been detected. Then, in step S1480, the light detection system 1301 stops the photoelectric conversion device 1302 and ends the operation of the light detection system 1301.

Although the present embodiment exemplifies the example in which the flowchart is looped for each row, the flowchart may be looped for each plurality of rows, or the failure detection operation may be performed for each frame. The alert of step S1470 may be notified to the outside of the vehicle via a wireless network.

Further, in the present embodiment, the control in which the vehicle does not collide with another vehicle has been described, but the present embodiment is also applicable to a control in which the vehicle is automatically driven following another vehicle, a control in which the vehicle is automatically driven so as not to protrude from the lane, and the like. Further, the light detection system 1301 can be applied not only to a vehicle such as a host vehicle, but also to a movable body (movable apparatus) such as a ship, an aircraft, or an industrial robot. In addition, the present embodiment can be applied not only to a movable body but also to an apparatus utilizing object recognition such as an intelligent transport system (ITS). The photoelectric conversion device of the present disclosure may be a configuration capable of further acquiring various types of information such as distance information.

Eighth Embodiment

Figure 19A:
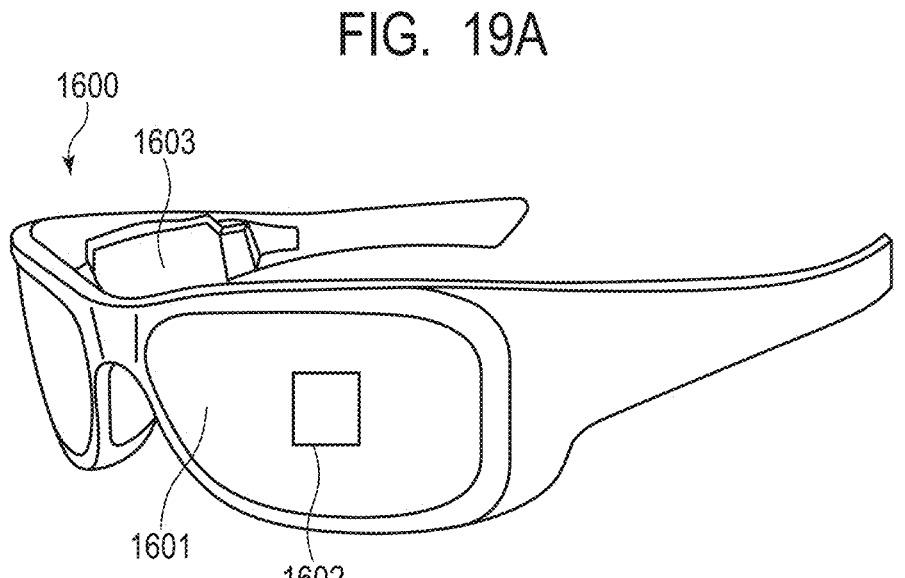
FIG. 19A illustrates a diagram showing a specific example of the electronic device according to the eighth embodiment.

FIG. 19A is a diagram illustrating a specific example of an electronic device according to the present embodiment. More specifically, FIG. 19A illustrates glasses 1600 (smart glasses). The glasses 1600 are provided with a photoelectric conversion device 1602 described in the above embodiments. That is, the glasses 1600 are an example of a light detection system to which the photoelectric conversion device 1602 described in each of the above embodiments can be applied. A display device including a light emitting device such as an OLED or an LED may be provided on the back surface side of a lens 1601. One photoelectric conversion device 1602 may be provided, or multiple photoelectric conversion devices 1602 may be provided. Further, multiple types of photoelectric conversion devices may be combined. The arrangement position of the photoelectric conversion device 1602 is not limited to that illustrated in FIG. 19A.

The glasses 1600 further comprise a control device 1603. The control device 1603 functions as a power source for supplying power to the photoelectric conversion device 1602 and the above-described display device. The control device 1603 controls operations of the photoelectric conversion device 1602 and the display device. The lens 1601 is provided with an optical system for collecting light to the photoelectric conversion device 1602.

Figure 19B:
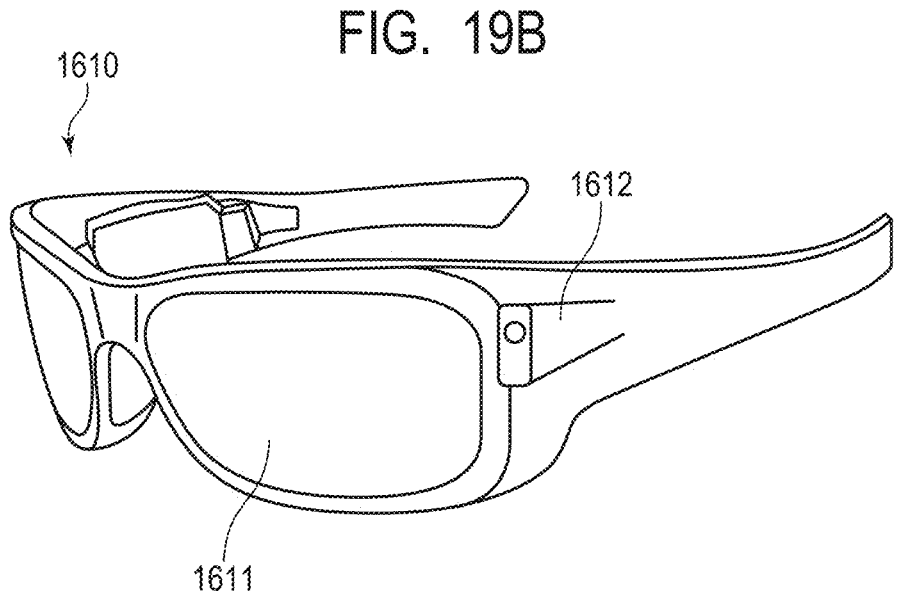
FIG. 19B illustrates a diagram showing a specific example of the electronic device according to the eighth embodiment.

FIG. 19B illustrates glasses 1610 (smart glasses) according to one application example. The glasses 1610 include a control device 1612, and a photoelectric conversion device corresponding to the photoelectric conversion device 1602 and a display device are mounted on the control device 1612. A lens 1611 is provided with a photoelectric conversion device in the control device 1612 and an optical system for projecting light emitted from a display device, and an image is projected on the lens 1611. The control device 1612 functions as a power source for supplying power to the photoelectric conversion device and the display device, and controls operations of the photoelectric conversion device and the display device. The control device 1612 may include a line-of-sight detection unit that detects the line of sight of the wearer. Infrared radiation may be used to detect the line of sight. The infrared light emitting unit emits infrared light to the eyeball of the user who is watching the display image. The reflected light of the emitted infrared light from the eyeball is detected by an imaging unit having a light receiving element, whereby a captured image of the eyeball is obtained. A reduction unit that reduces light from the infrared light emitting unit to the display unit in a plan view may be employed and the reduction unit reduces a degradation in image quality.

The control device 1612 detects the line of sight of the user with respect to the display image from the captured image of the eyeball obtained by imaging the infrared light. Any known method can be applied to the line-of-sight detection using the captured image of the eyeball. As an example, a line-of-sight detection method based on a Purkinje image due to reflection of irradiation light at a cornea can be used.

More specifically, a line-of-sight detection process based on a pupil cornea reflection method is performed. By using the pupil cornea reflection method, a line-of-sight vector representing a direction (rotation angle) of the eyeball is calculated based on the image of the pupil included in the captured image of the eyeball and the Purkinje image, whereby the line-of-sight of the user is detected.

The display device of the present embodiment may include a photoelectric conversion device having a light receiving element, and may control a display image of the display device based on line-of-sight information of the user from the photoelectric conversion device.

Specifically, the display device determines a first view field region gazed by the user and a second view field region other than the first view field region based on the line-of-sight information. The first view field region and the second view field region may be determined by a control device of the display device, or may be determined by an external control device. In the display area of the display device, the display resolution of the first view field region may be controlled to be higher than the display resolution of the second view field region. That is, the resolution of the second view field region may be lower than that of the first view field region.

The display area may include a first display region and a second display region different from the first display region. A region having a high priority may be determined from the first display region and the second display region based on the line-of-sight information. The first view field region and the second view field region may be determined by a control device of the display device, or may be determined by an external control device. The resolution of the high priority area may be controlled to be higher than the resolution of the region other than the high priority region. That is, the resolution of a region having a relatively low priority can be reduced.

It should be noted that an artificial intelligence (AI) may be used in determining the first view field region and the region with high priority. The AI may be a model configured to estimate an angle of a line of sight and a distance to a target on the line-of-sight from an image of an eyeball, and the AI may be trained using training data including images of an eyeball and an angle at which the eyeball in the images actually gazes. The AI program may be provided in either a display device or a photoelectric conversion device, or may be provided in an external device. When the external device has the AI program, the AI program may be transmitted from a server or the like to a display device via communication.

When the display control is performed based on the line-of-sight detection, the present embodiment can be preferably applied to smart glasses which further includes a photoelectric conversion device for capturing an image of the outside. The smart glasses can display captured external information in real time.

Other Embodiments

It should be noted that any of the above-described embodiments is merely an example of an embodiment for implementing the present disclosure, and the technical scope of the present disclosure should not be construed as being limited thereto. That is, the present disclosure can be implemented in various forms without departing from the technical idea or the main features thereof.

According to the present disclosure, the circuit configuration of the photoelectric conversion device can be simplified.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-075577, filed on May 1, 2023, which is hereby incorporated by reference herein in its entirety.

What is claimed is:

1. A photoelectric conversion device comprising:
a detector that generates a change in voltage in response to an incident photon;
a switch arranged between the detector and a power node, the switch supplying a current for the detector from the power node to change a voltage of the detector to a predetermined bias voltage when being in an ON state, the switch cutting off the current supplied from the power node to the detector when being in an OFF state;
a first circuit that generates a first detection signal based on a first periodic signal and the change in voltage of the detector;
a second circuit that generates a second detection signal based on a second periodic signal and the change in voltage of the detector, the second periodic signal having a predetermined phase difference with respect to the first periodic signal;
a counter that counts the first detection signal or the second detection signal to output a count value; and
a controller that generates:
a first signal for causing the first circuit to generate the first detection signal; and
a second signal for causing the second circuit to generate the second detection signal,
wherein the first periodic signal and the second periodic signal are generated based on the first signal or the second signal.

2. The photoelectric conversion device according to claim 1, wherein the first signal and the second signal are a common signal.

3. The photoelectric conversion device according to claim 2,
wherein the first periodic signal has a first phase difference with respect to the common signal,
wherein the second periodic signal has a second phase difference with respect to the common signal, the second phase difference being smaller than the first phase difference, and
wherein a period for which the second circuit generates the second detection signal based on the change in voltage of the detector is shorter than a period for which the first circuit generates the first detection signal based on the change in voltage of the detector.

4. The photoelectric conversion device according to claim 3,
wherein the first circuit generates the first detection signal based on the change in voltage of the detector in a period for which the switch is in the ON state, and
wherein the second circuit generates the second detection signal based on the change in voltage of the detector in a period for which the switch is in the ON state.

5. The photoelectric conversion device according to claim 4, wherein the second circuit does not generate the second detection signal based on the change in voltage of the detector in a part of a period for which the switch is in the OFF state.

6. The photoelectric conversion device according to claim 3, further comprising a selector that selects a count value that is based on the first detection signal or a count value that is based on the second detection signal, and outputs the selected count value as a pixel value.

7. The photoelectric conversion device according to claim 6, further comprising a determination unit that determines whether the count value exceeds a predetermined threshold value,
wherein the determination unit outputs, to the selector, a signal for selecting the count value that is based on the second detection signal in a case where the count value exceeds the predetermined threshold value.

8. The photoelectric conversion device according to claim 7, wherein the determination unit outputs the signal for selecting the count value to the selector within a period corresponding to one frame.

9. The photoelectric conversion device according to claim 7, wherein the determination unit outputs, to the selector, the signal for selecting the count value that is based on the first detection signal generated by the first circuit in a case where the count value is less than the predetermined threshold value.

10. The photoelectric conversion device according to claim 9, wherein the determination unit outputs a signal for identifying the first circuit that has generated the selected first detection signal or the second circuit that has generated the selected second detection signal.

11. The photoelectric conversion device according to claim 1, wherein the switch turns to the ON state or the OFF state based on the first periodic signal generated by the controller.

12. The photoelectric conversion device according to claim 11,
wherein the second periodic signal has a phase difference with respect to the first or second signal generated by the controller, and
wherein a period for which the second circuit generates the second detection signal that is based on the change in voltage of the detector is shorter than a period for which the first circuit generates the first detection signal that is based on the change in voltage of detector.

13. The photoelectric conversion device according to claim 12, wherein the first circuit generates the first detection signal that is based on the change in voltage of the detector over periods for which the switch is in the ON state and in the OFF state.

14. The photoelectric conversion device according to claim 1,
wherein the first periodic signal and the second periodic signal are pulse signals, and
wherein the first periodic signal and the second periodic signal have a same pulse width and a same frequency.

15. The photoelectric conversion device according to claim 1, wherein the detector includes a single photon avalanche diode (SPAD).

16. A light detection system comprising:
the photoelectric conversion device according to claim 1; and
a signal processing device that processes an image signal output from the photoelectric conversion device.

17. The light detection system according to claim 16, wherein the signal processing device generates a distance image indicating distance information to an object based on the image signal.

18. A movable body comprising:

the photoelectric conversion device according to claim 1;

a distance information acquisition unit that acquires distance information to an object based on an image signal output from the photoelectric conversion device; and a controller that controls the movable body based on the distance information.

19. A method of controlling a photoelectric conversion device including a detector and a switch arranged between the detector and a power node, the method comprising:

generating, in the detector, a change in voltage in response to an incident photon;

turning the switch to an ON state to supply a current for the detector from the power node for changing a voltage of the detector to a predetermined bias voltage;

turning the switch to an OFF state to cut off the current supplied from the power node to the detector;

generating a first detection signal based on a first periodic signal and the change in voltage of the detector;

generating a second detection signal based on a second periodic signal and the change in voltage of the detector, the second periodic signal having a predetermined phase difference with respect to the first periodic signal;

counting the first detection signal or the second detection signal to output a count value;

generating a first signal for generating the first detection signal or a second signal for generating the second detection signal; and generating the first periodic signal and the second periodic signal based on the first signal or the second signal.

\* \* \* \* \*